(12) United States Patent
Cui et al.

(10) Patent No.: US 11,745,963 B1
(45) Date of Patent: Sep. 5, 2023

(54) OBJECT COLLECTING HEADS FOR OBJECT COLLECTING SYSTEMS

(71) Applicants: Kan Cui, Mercer Island, WA (US); Margaret Liu, Mercer Island, WA (US); Samuel Liu, Mercer Island, WA (US)

(72) Inventors: Kan Cui, Mercer Island, WA (US); Margaret Liu, Mercer Island, WA (US); Samuel Liu, Mercer Island, WA (US)

(*) Notice: Subject to any disclaimer, the term of this patent is extended or adjusted under 35 U.S.C. 154(b) by 0 days.

(21) Appl. No.: 18/095,301

(22) Filed: Jan. 10, 2023

(51) Int. Cl.
*B65G 65/02* (2006.01)
*B65G 65/16* (2006.01)
*A01B 43/00* (2006.01)

(52) U.S. Cl.
CPC .................... *B65G 65/02* (2013.01)

(58) Field of Classification Search
CPC ........ B65G 65/02; B65G 65/16; A01B 43/00; B25J 15/0028
USPC .......................... 198/514, 626.1, 626.2, 626.4
See application file for complete search history.

(56) References Cited

U.S. PATENT DOCUMENTS

| | | | |
|---|---|---|---|
| 2,928,225 A | 3/1960 | Spencer | |
| 3,872,657 A | 3/1975 | Ramacher et al. | |
| 4,113,023 A * | 9/1978 | Baskett | E02F 3/96 37/301 |
| 4,434,011 A | 2/1984 | Moore | |
| 5,191,966 A * | 3/1993 | Miller | B65G 67/606 198/493 |
| 5,228,552 A * | 7/1993 | Brandl | B65G 65/16 299/68 |
| 5,329,661 A | 7/1994 | Smith | |
| 7,322,177 B2 | 1/2008 | Geraghty | |
| 8,991,884 B2 * | 3/2015 | DeLouis | B25J 15/0009 294/111 |
| 9,844,885 B2 * | 12/2017 | Wong | B25J 15/10 |
| 10,800,030 B1 | 10/2020 | Cui et al. | |
| 11,138,712 B2 | 10/2021 | Frei et al. | |
| 11,203,847 B1 | 12/2021 | Gordon | |
| 11,270,423 B2 * | 3/2022 | Frei | G06T 7/73 |
| 2020/0015401 A1 | 1/2020 | Frei et al. | |

(Continued)

FOREIGN PATENT DOCUMENTS

SU 1331936 A1 8/1987

*Primary Examiner* — Douglas A Hess
(74) *Attorney, Agent, or Firm* — Nath, Goldberg & Meyer; Richard C. Litman

(57) ABSTRACT

The object collecting heads for object collecting systems includes several embodiments of object collecting heads including light and heavy-duty object collecting heads. The object collecting heads are used to grasp and convey differently sized and randomly shaped objects from a surface to an object holding bin of the object collecting system and are attached to the object holding bin using an adjustable support assembly. Both object collecting heads have three blocks including an upper block, a lower left block, and a lower right block. The lower blocks are connected to each other and the adjustable support assembly by an angled lower block bracket. The upper block is attached to the lower blocks by spring-loaded hinges, such that the upper block is urged toward the lower blocks to grasp an object therebetween. The light-duty object collecting head is a chain-based head, while the heavy-duty object collecting head is a roller-based head.

19 Claims, 19 Drawing Sheets

(56) References Cited

U.S. PATENT DOCUMENTS

| | | |
|---|---|---|
| 2021/0358104 A1 | 11/2021 | Frei et al. |
| 2022/0007560 A1 | 1/2022 | Frei et al. |
| 2022/0028048 A1 | 1/2022 | Frei et al. |
| 2022/0164941 A1 | 5/2022 | Frei et al. |

\* cited by examiner

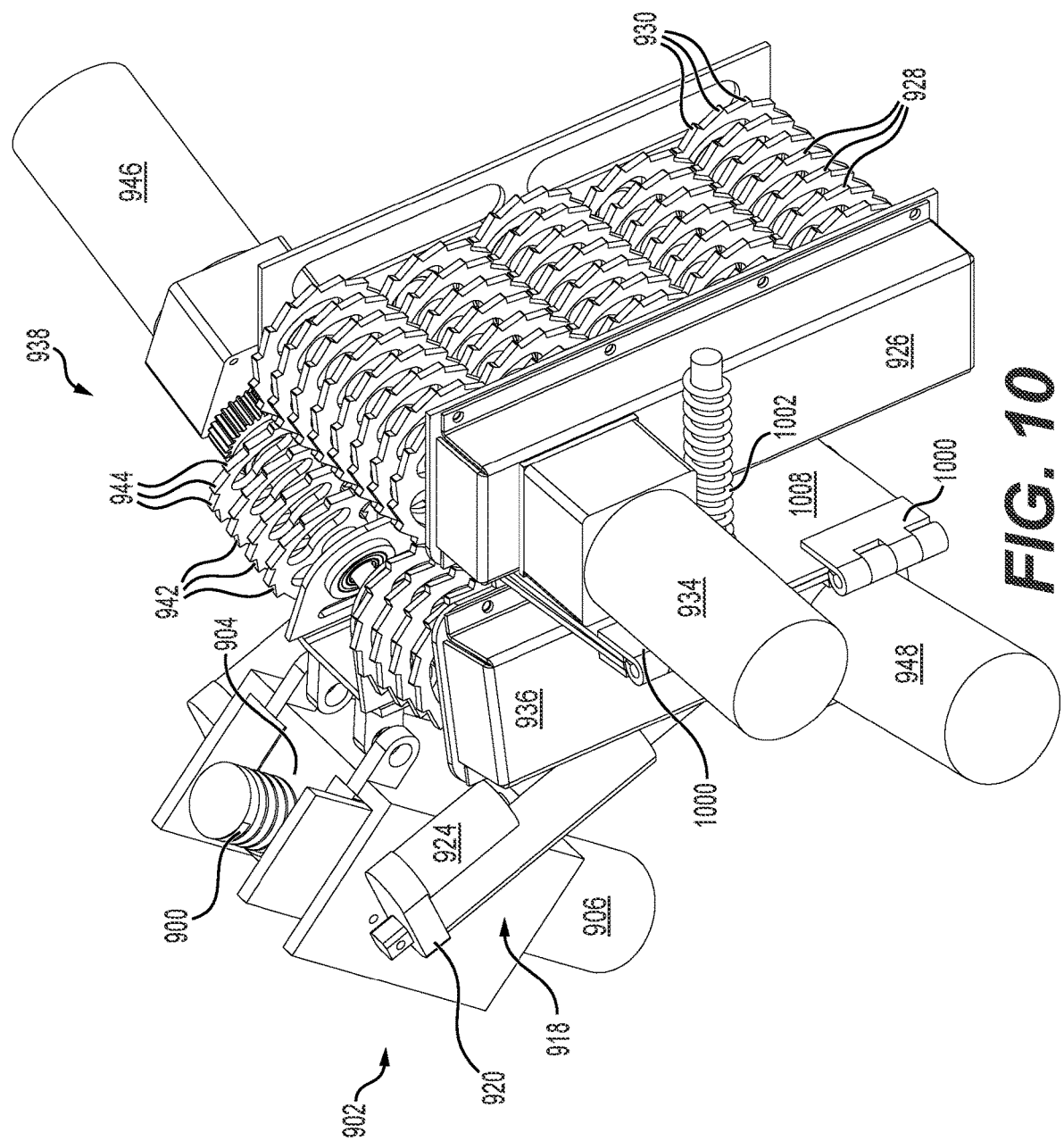

OBJECT COLLECTING HEADS FOR OBJECT COLLECTING SYSTEMS

BACKGROUND

1. Field

The disclosure of the present patent application relates to object collecting and transporting systems, and particularly to object collecting heads for object collecting systems.

2. Description of the Related Art

In general, object collecting heads and object collecting systems are known, both separately and as integrated systems. Examples include excavators and dump trucks for loading and transporting soil in agricultural and construction applications, heavy duty cranes for loading and transporting debris in construction applications, maneuverable lifts for cargo lifting and placing in shipping and transportation applications, and ground vehicle mountable, manually controlled object picker systems, such as the one shown in U.S. patent application US 2022/0007560 A1, published on Jan. 13, 2022, to Frei et al. These object collecting systems, however, have several limitations. One such limitation is the manner in which the object collecting heads grasp the object being collected, as this often results in damage to the object. While this is not an issue in soil and debris applications, in other applications the objects may be fragile and valuable, such as when the collected objects are tools, electronic equipment, mechanical assemblies, etc. Another limitation is the inability of these systems to grasp and convey differently sized and randomly shaped objects from a surface (such as the ground) to an object holding bin.

Thus, object collecting heads for object collecting systems solving the aforementioned problems is desired.

SUMMARY

The object collecting heads for object collecting systems includes several embodiments of object collecting heads including light-duty and heavy-duty object collecting heads. The object collecting heads may be part of an object collecting system and used to grasp and convey differently sized and randomly shaped objects from a surface (such as the ground) to an object holding bin of the object collecting system. In an embodiment, the object collecting system includes a wheeled base for supporting the bin and moving the system around the surface to place the object collecting head(s) in the proper position for grasping the object. One or more wheels of the wheeled base may be powered by electrical motors, and the wheeled base may be a parallel self-maneuvering system as known in the prior art. A folding operation station assembly may be attached to the wheeled structure to support an operator in a seated or standing position. The operation station assembly includes an operation control assembly for manual control of the various components of the object collecting system. The folding operation station assembly may be folded (rotated) upwards to allow an operator to walk behind the object collecting system while operating the operation control assembly. One or more light-duty and/or heavy-duty object collecting heads may be attached to the object collecting system.

The object collecting heads for object collecting systems may be used with or without the object collecting systems described above. The heads can grasp objects from a first surface, such as the ground, a first container or a first conveyor belt and transport them to another surface, such as the ground, a second container or a second conveyor belt. Both the light-duty and heavy-duty object collecting heads may be attached to a receptacle/system using an adjustable support assembly for raising/lowering and tilting the head relative to the receptacle/system. The light-duty and heavy-duty object collecting heads both have three blocks including an upper block and lower blocks including a lower left block and a lower right block. The lower blocks are connected to the adjustable support assembly and one another by an angled lower block bracket forming a "trench" between the lower blocks. The upper block is attached to one of the lower blocks by spring-loaded hinges, such that the upper block is urged toward the lower blocks to grasp an object therebetween.

The light-duty object collecting head is a chain-based head and includes an upper chain block and lower blocks including a lower left chain block and a lower right chain block. The upper chain block includes two chains mounted on driving sprockets and four idler sprockets. The driving sprockets are mounted on a drive shaft that is driven by a rotary actuator. As used herein, non-limiting examples of rotary actuators include electric motors and hydraulic motors. Each link of the chains includes two oppositely extending chain side flanges attached thereto, to increase the surface area in contact with the object grasped between the blocks.

The heavy-duty object collecting head is a roller or disc-based head and includes an upper roller block and lower roller blocks including a lower left roller block and a lower right roller block. Each of the roller blocks includes a plurality of relatively thin rollers or discs that are driven by a roller drive. Each of the rollers include roller teeth about their outer perimeter for engaging an object. The roller teeth are angled toward the direction the object is to be urged (the rear of the heavy-duty object collecting head). The roller blocks may be belt, linkage or gear driven.

These and other features of the present subject matter will become readily apparent upon further review of the following specification.

BRIEF DESCRIPTION OF THE DRAWINGS

FIG. 10 is an isometric top-right side view of the heavy-duty object collecting head of FIGS. 1-2 and 5-6.

Similar reference characters denote corresponding features consistently throughout the attached drawings.

DETAILED DESCRIPTION OF THE PREFERRED EMBODIMENTS

Figure 1:
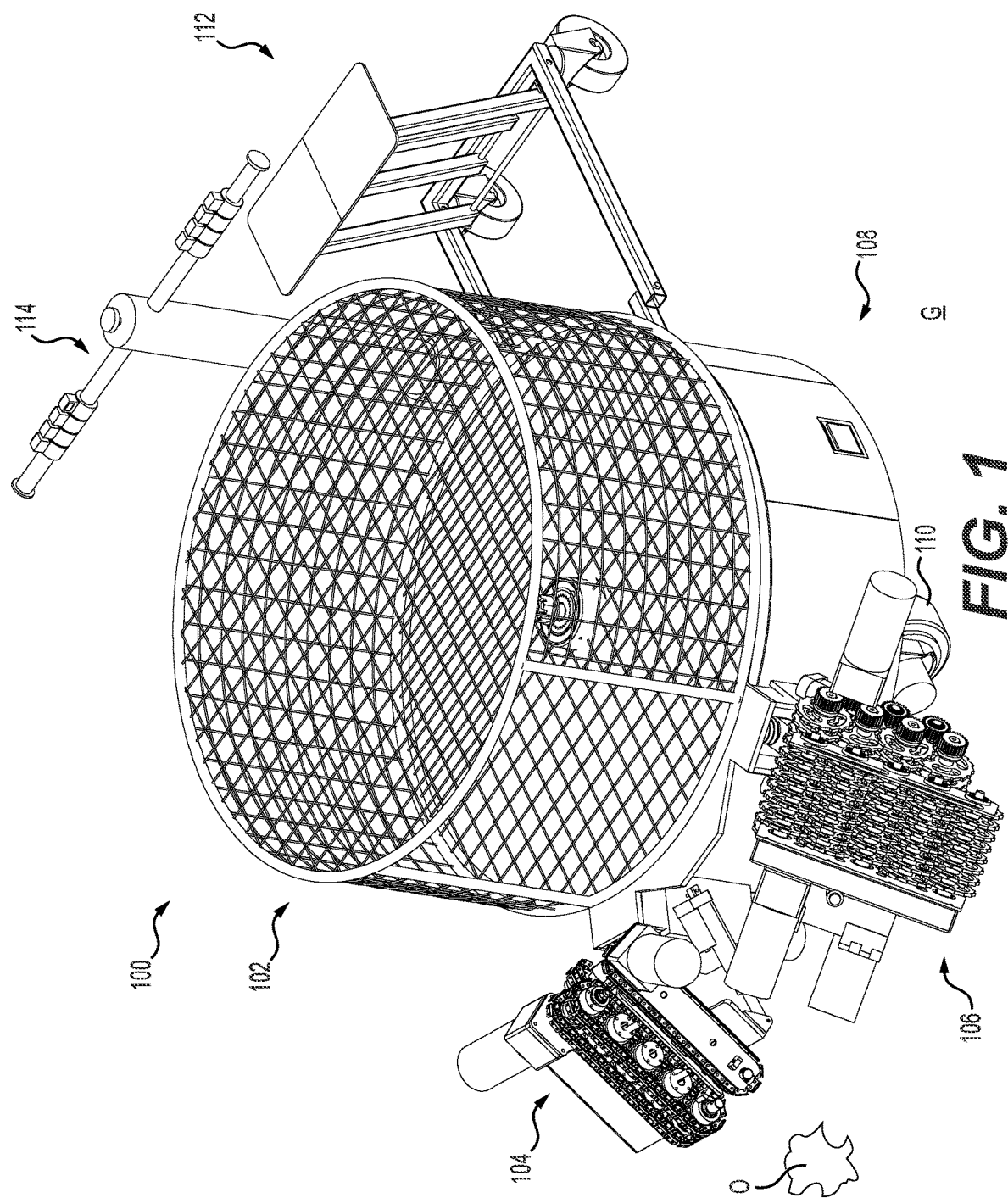
FIG. 1 is an environmental isometric front-left view of a first embodiment of an object collecting system with light-duty and heavy-duty object collecting heads.
Figure 2:
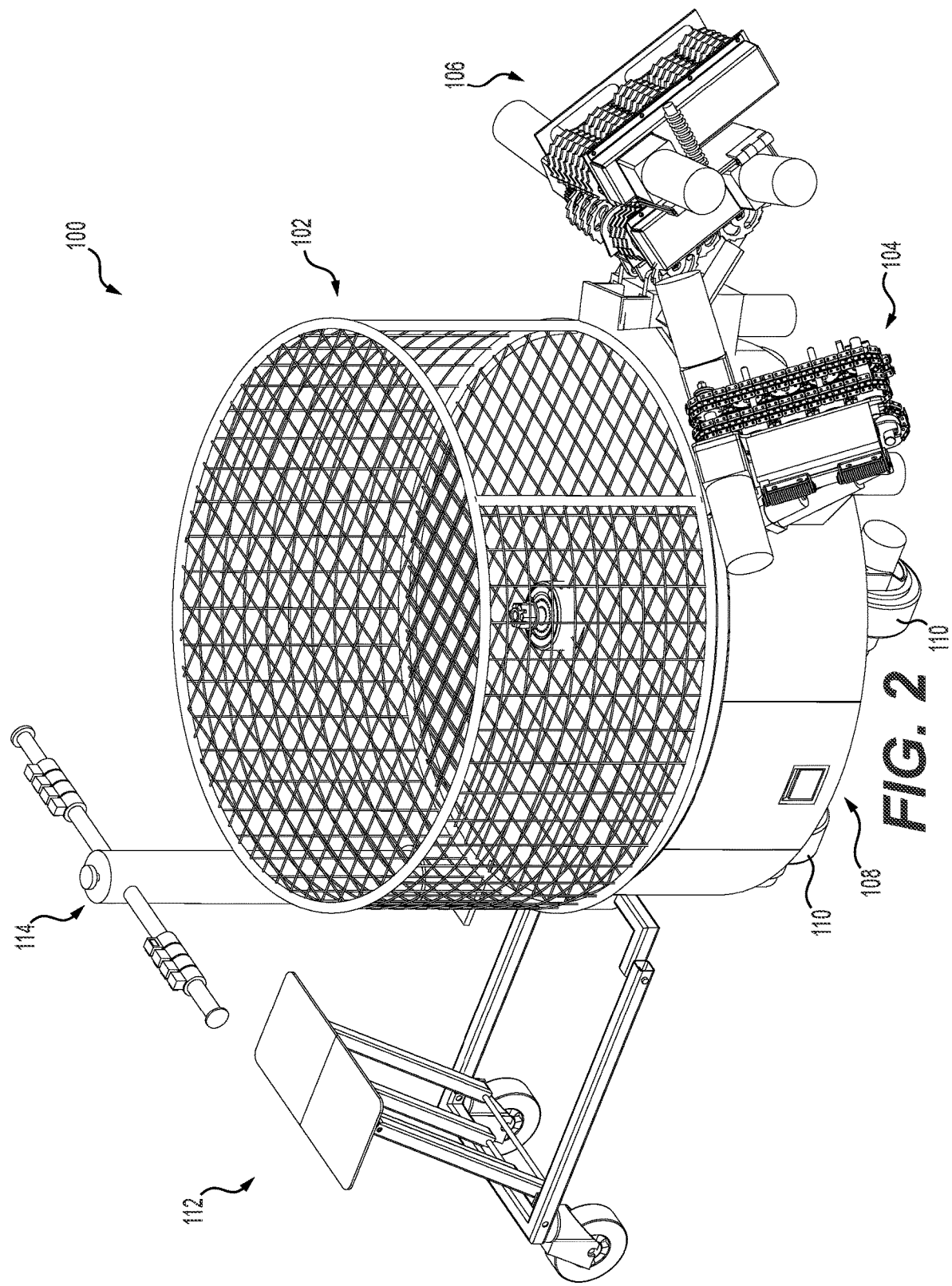
FIG. 2 is an environmental isometric front-right view of the object collecting system of FIG. 1.

A first embodiment of an object collecting system 100 with a light-duty collecting head 104 and a heavy-duty object collecting head 106 is shown in FIGS. 1 and 2. The object collecting system 100 includes an object holding bin or cage 102 mounted on a system base 108. The system base 108 may include a plurality of powered and/or nonpowered wheels 110 for moving the system 100 along a surface such as the ground G. The object collecting heads 104, 106 grasp objects O on the ground G and propel them into the object gathering cage 102 as described in detail below. An operation station assembly 112 is connected to the base 108 and includes an operation control assembly 114 for controlling the various components of the object collecting system 100. It should be noted that the light-duty collecting head 104 and the heavy-duty object collecting head 106 can be used with any type of object storage bin, either fixed or moveable, and the above described object collecting system 100 is simply shown as one example of a receptacle for receiving the objects from the object collecting heads 104, 106. It should be also noted that, when multiple collecting heads are used, it is also contemplated that a combination of light-duty collecting heads and heavy-duty collecting heads may be used, and the inventive concepts are not limited to the use of a single type of collecting head.

Figure 3:
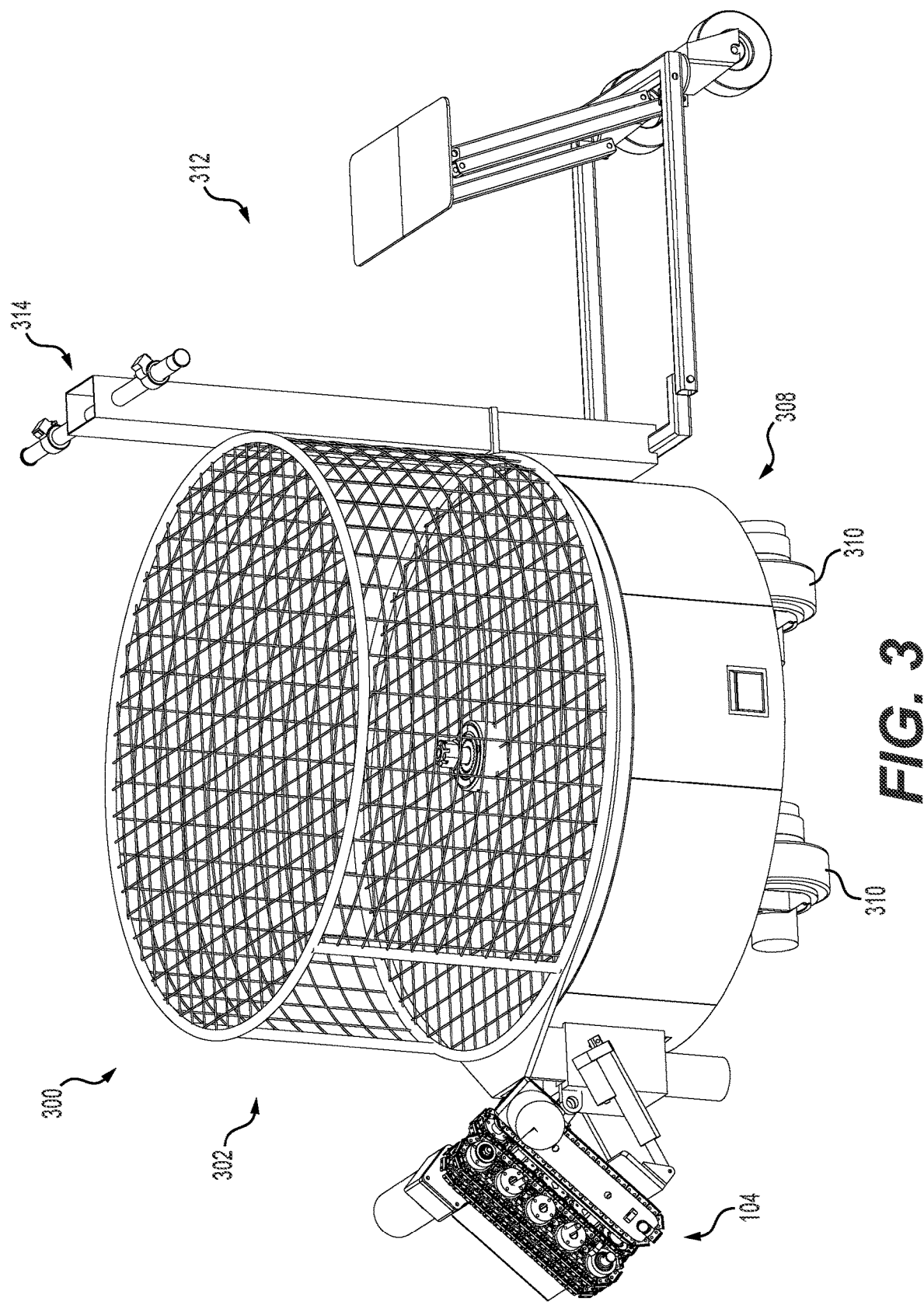
FIG. 3 is an environmental isometric left side view of a second embodiment of an object collecting system with a light-duty object collecting head.
Figure 4:
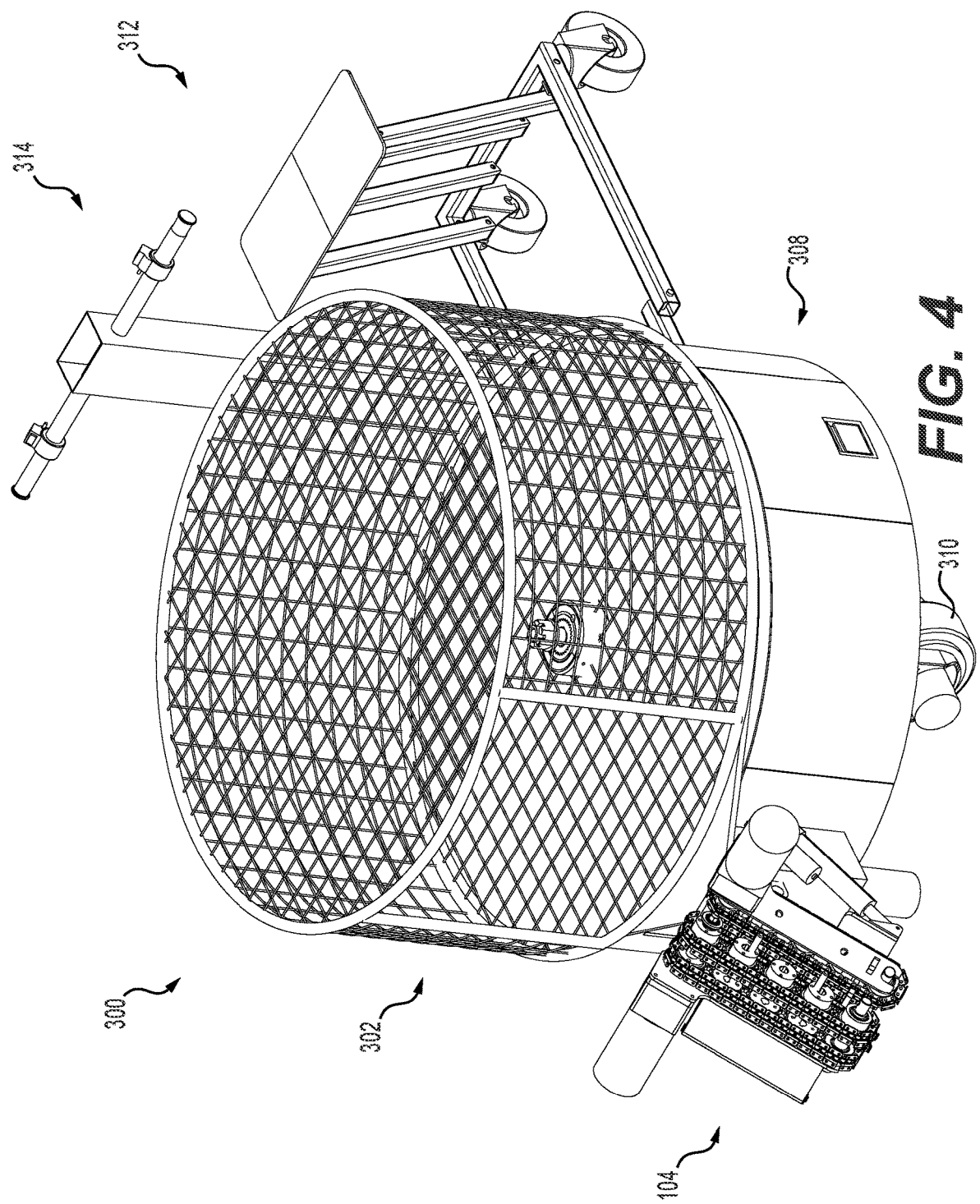
FIG. 4 is an environmental isometric front-left view of the object collecting system of FIG. 3.

A second embodiment of an object collecting system 300 with only the light-duty collecting head 104 is shown in FIGS. 3 and 4. The object collecting system 300 includes an object storage bin or cage 302 mounted on a system base 308. The system base 308 may include a plurality of powered and/or nonpowered wheels 310 for moving the system 300 along a surface. The light-duty object collecting head 104 grasps objects on the ground and propels them into the object gathering cage 302 as described in detail below. An operation station assembly 312 is connected to the base 308 and includes an operation control assembly 314 for controlling the various components of the object collecting system 300. It should be noted that the light-duty collecting head 104 can be used with any type of object storage bin, either fixed or moveable, and the above described object collecting system 300 is simply shown as one example of a receptacle for receiving the objects from the light-duty object collecting head 104.

Figure 5:
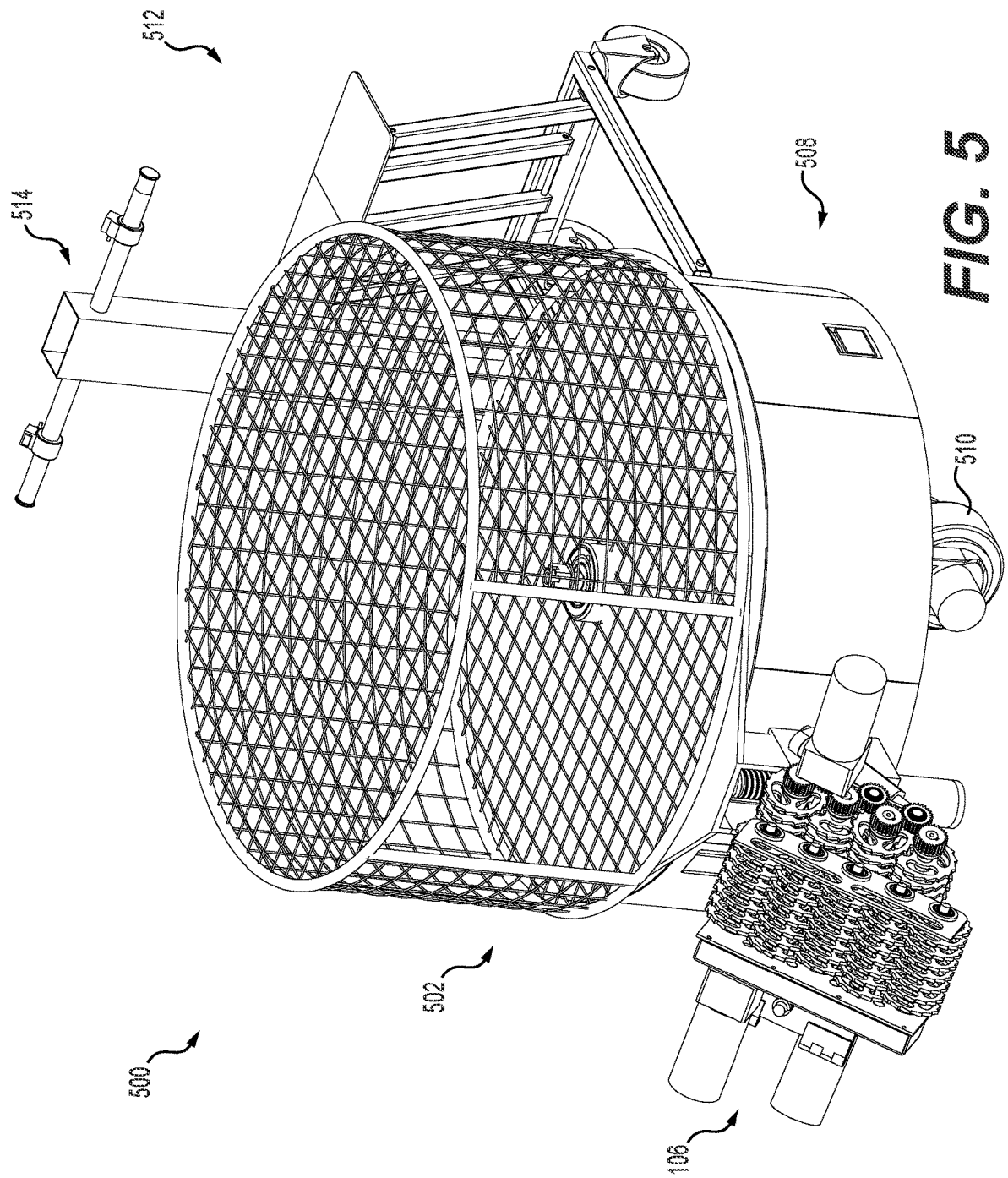
FIG. 5 is an environmental isometric front-left view of a third embodiment of an object collecting system with a heavy-duty object collecting head.
Figure 6:
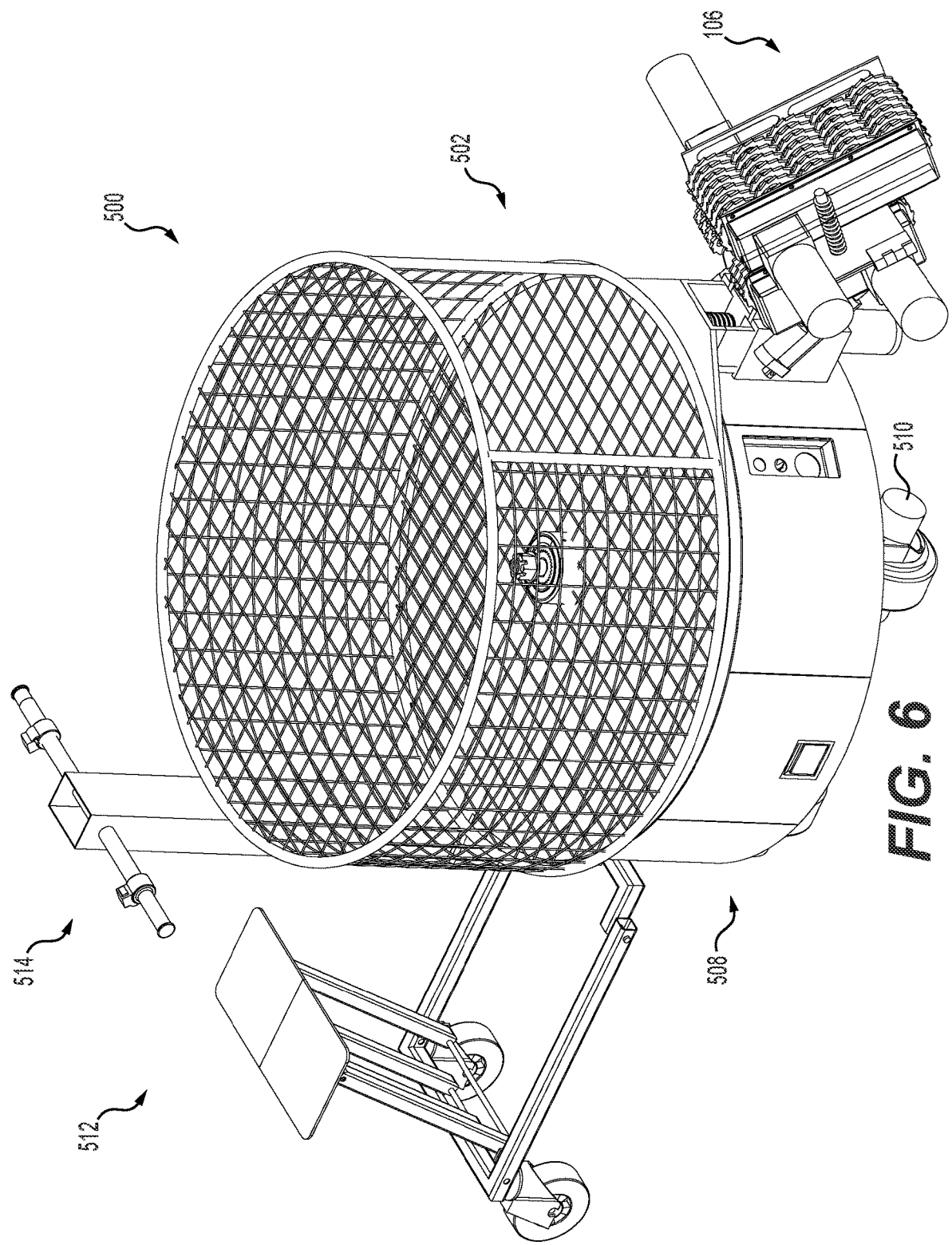
FIG. 6 is an environmental isometric front-right view of the object collecting system of FIG. 5.

A third embodiment of an object collecting system 500 with only the heavy-duty collecting head 106 is shown in FIGS. 5 and 6. The object collecting system 500 includes an object storage bin or cage 502 mounted on a system base 508. The system base 508 may include a plurality of powered and/or nonpowered wheels 510 for moving the system 500 along a surface. The heavy-duty object collecting head 106 grasps objects on the ground and propels them into the object gathering cage 502 as described in detail below. An operation station assembly 512 is connected to the base 508 and includes an operation control assembly 514 for controlling the various components of the object collecting system 500. It should be noted that the heavy-duty collecting head 106 can be used with any type of object storage bin, either fixed or moveable, and the above-described object collecting system 500 is simply shown as one example of a receptacle for receiving the objects from the heavy-duty collecting head 106. operation control assembly 514.

Figure 7:
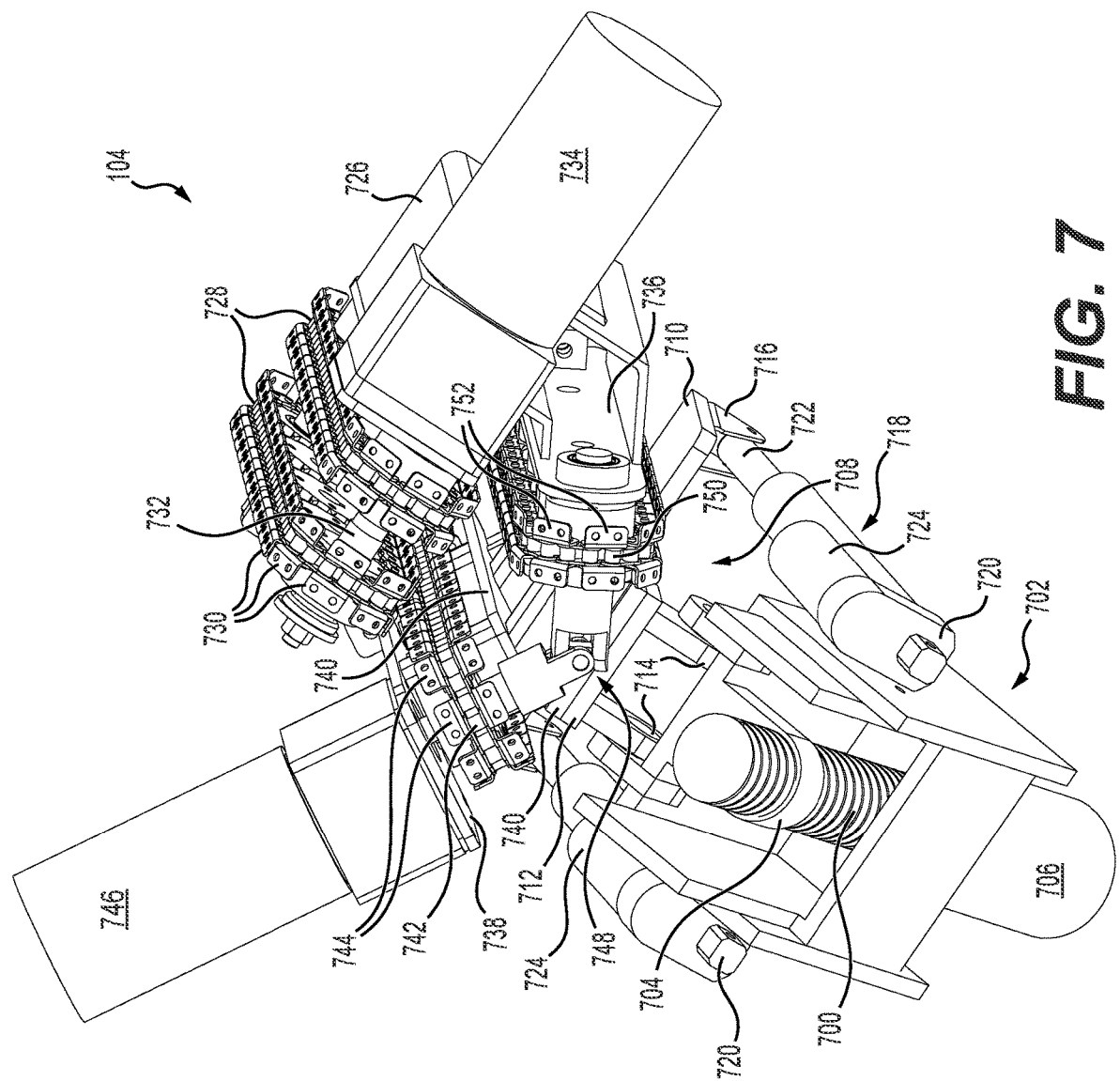
FIG. 7 is an isometric top-rear view of the light-duty object collecting head of FIGS. 1-4.
Figure 8:
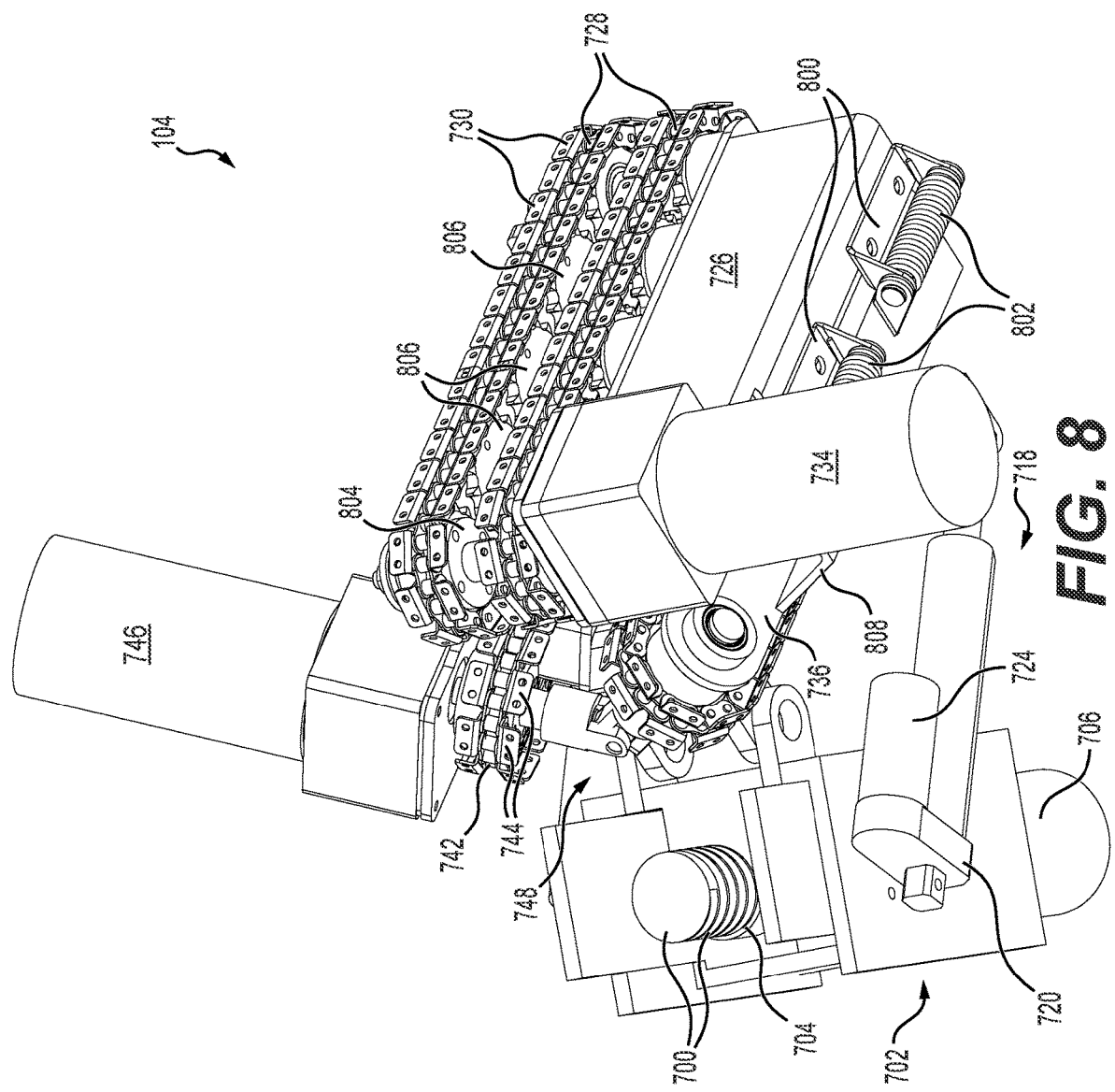
FIG. 8 is an isometric top-right side view of the light-duty object collecting head of FIGS. 1-4 and 7.

The details of the light-duty object collecting head 104 are shown in FIGS. 7 and 8. The light-duty object collecting head 104 is attached to a receptacle using an adjustable support assembly. The support assembly includes an externally threaded support post 700 and a slider assembly 702. The externally threaded support post 700 extends through an internally threaded slider support tab 704 on the slider assembly 702. A support post drive actuator 706 drives the externally threaded support post 700, thereby raising and lowering the slider assembly 702 relative to a receptacle to which the externally threaded support post 700 and the support post drive actuator 706 are attached (see, for example the description of FIGS. 13 and 14 below). A tiltable support frame 708 includes a lower frame 710 and an upper frame 712. The upper frame 712 is rotatably connected to the slider assembly 702 by two upper frame bushings 714. The lower frame 710 includes two support brackets 716. Tilt actuators 718 include upper ends 720 rotatably attached to the sides of the slider assembly 702 and lower ends 722 rotatably attached to the support brackets 716. Tilt actuator drives 724 operate the tilt actuators 718 to extend or retract the lower ends 722, relative to the upper ends 720. In an embodiment, the tilt actuators 718 may be threaded rods and the tilt actuator drives 724 may be rotary actuators, for example electrical motors or pneumatic motors.

The light-duty object collecting head 104 is a chain-based head and includes an upper chain block 726 and lower chain blocks, including a lower left chain block 736 and a lower right chain block 738. The lower left chain block 736 and the lower right chain block 738 are attached to the top of the tiltable support frame 708 by an angled lower chain block bracket 740. The bracket 740 maintains the lower left chain block 736 and the lower right chain block 738 at an angle relative to one another. The upper chain block 726 is rotatably attached to the lower left chain block 736 by at least one spring-loaded hinge 800 mounted on a bracket 808. Multiple spring hinges may be used. The spring-loaded hinges 800 include springs 802 for urging the upper chain block 726 toward the lower left chain block 736 and the lower right chain block 738, thereby grasping an object between the blocks 726, 736, 738.

The upper chain block 726 includes two chains 728 mounted on driving sprockets 804 and a plurality of (four shown) idler sprockets 806. The driving sprockets 804 are mounted on a drive shaft 732 that is driven by an upper chain drive 734, which in an embodiment, may be a rotary actuator, for example an electric or pneumatic motor. Each link of the chains 728 includes two oppositely extending chain side flanges 730 attached thereto, to increase the surface area in contact with the object grasped between the blocks 726, 736, 738. The lower left chain block 736 includes a single chain 750 with chain side flanges 752 and similarly, the lower right chain block 738 includes a single chain 742 with chain side flanges 744. The drive sprockets (not shown) of the lower left chain block 736 and the lower right chain block 738 are driven by a lower chain drive 746, which, in an embodiment, may be a rotary actuator, for example an electric or pneumatic motor. In the embodiment as shown, the drive shafts of the lower blocks 736, 738 are connected to one another by a universal joint 748, to allow both chains to be driven by a single lower chain drive 746. Alternatively, each lower block 736, 738 may include a separate chain drive, actuator, or motor. Each chain discussed herein includes a plurality of respective links and side flanges.

Thus, in summary, the upper chain block includes: a first drive shaft, first and second driving sprockets mounted on the first drive shaft, a plurality of first idler sprockets and a plurality of second idler sprockets, first and second chains mounted on the respective driving sprockets and idler sprockets, and a first chain drive for driving the first drive shaft. Likewise, the lower left chain block includes: a second drive shaft, a third driving sprocket mounted on the second drive shaft, a plurality of third idler sprockets, and a third chain mounted on the third driving sprocket and the plurality of third idler sprockets. Similarly, the lower right chain block includes: a fourth drive shaft, a fourth driving sprocket mounted on the fourth drive shaft, a plurality of fourth idler sprockets, a fourth chain mounted on the fourth driving sprocket and the plurality of fourth idler sprockets. The object collecting head further includes at least one second chain drive for driving the third drive shaft and the fourth drive shaft.

Figure 9:
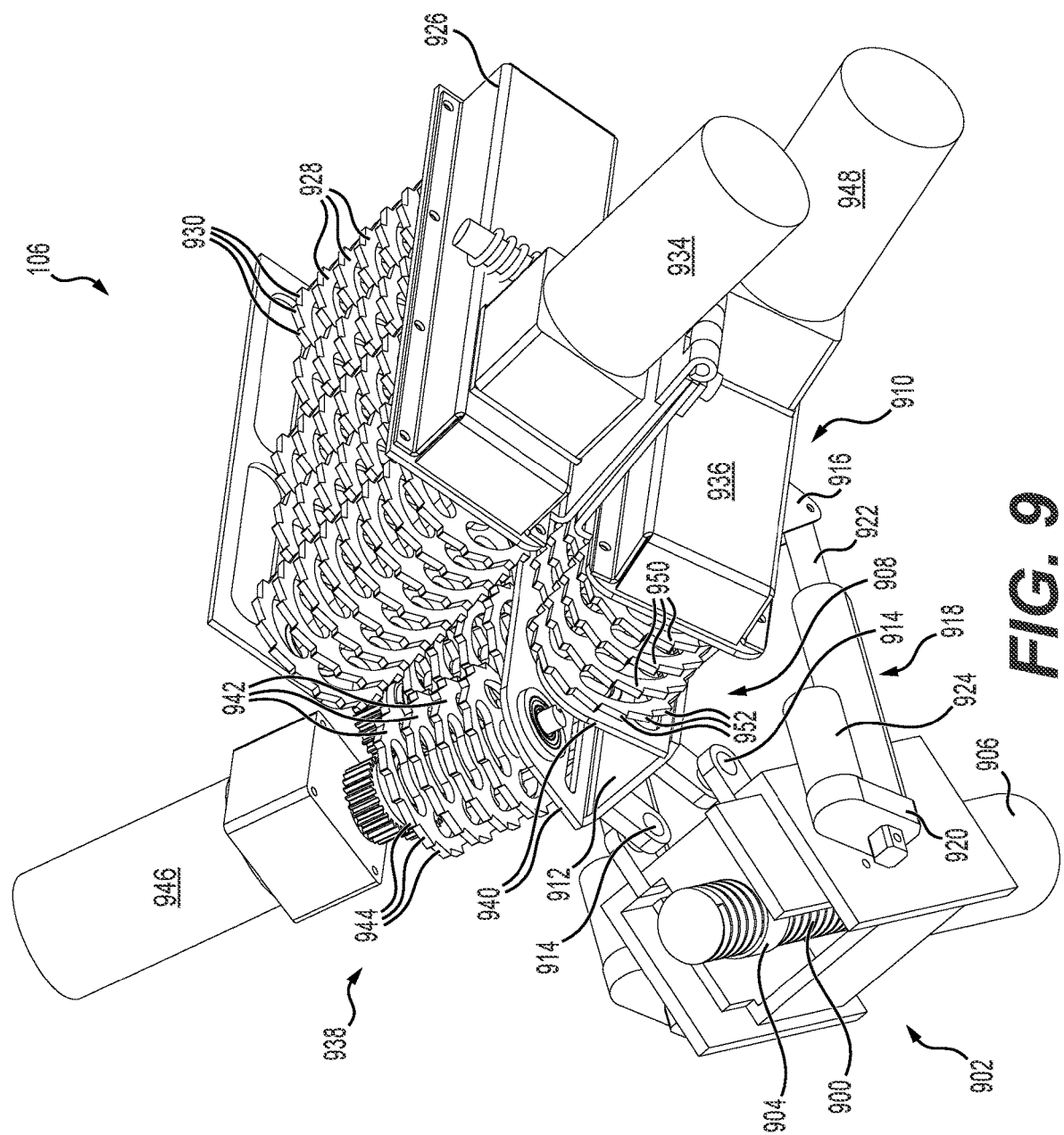
FIG. 9 is an isometric top-rear view of the heavy-duty object collecting head of FIGS. 1-2 and 5-6.

The details of the heavy-duty object collecting head 106 are shown in FIGS. 9 and 10. The heavy-duty object collecting head 106 is attached to a receptacle using an adjustable support assembly, similar to the light-duty object collecting head 104. The support assembly includes an externally threaded support post 900 and a slider assembly 902. The externally threaded support post 900 extends through an internally threaded slider support tab 904 on the slider assembly 902. A support post drive actuator 906 drives the externally threaded support post 900, thereby raising and lowering the slider assembly 902 relative to a receptacle to which the externally threaded support post 900 and the support post drive actuator 906 are attached (see, for example the description of FIGS. 13 and 14 below). A tiltable support frame 908 includes a lower frame 910 and an upper frame 912. The upper frame 912 is rotatably connected to the slider assembly 902 by two upper frame bushings 914. The lower frame 910 includes two support brackets 916. Tilt actuators 918 include upper ends 920 rotatably attached to the sides of the slider assembly 902 and lower ends 922 rotatably attached to the support brackets 916. Tilt actuator drives 924 operate the tilt actuators 918 to extend or retract the lower ends 922, relative to the upper ends 920. In an embodiment, the tilt actuators 918 may be threaded rods and the tilt actuator drives 924 may be rotary actuators, for example electrical or pneumatic motors.

The heavy-duty object collecting head 106 is a roller or disc-based head and includes an upper roller block 926, a lower left roller block 936, and a lower right roller block 938. The lower left roller block 936 and the lower right roller block 938 are attached to the top of the tiltable support frame 908 by an angled lower chain block bracket 940. The bracket 940 maintains the lower left roller block 936 and the lower right roller block 938 at an angle relative to one another. The upper roller block 926 is rotatably attached to the lower left roller block 936 by spring-loaded hinges 1000 mounted on a bracket 1008. The spring-loaded hinges 1000 include a spring 1002 for urging the upper roller block 926 toward the lower left roller block 936 and the lower right roller block 938, thereby grasping an object between the blocks 926, 936, 938.

The upper roller block 926 includes a plurality of relatively thin rollers or discs 928 that are driven by an upper roller drive 934, as shown and described below with respect to FIGS. 11a-c. Each of the rollers 928 include roller teeth 930 about their outer perimeter. The roller teeth 930 are angled toward the direction the object is to be urged (the rear of the heavy-duty object collecting head 106). Similarly, the lower left roller block 936 includes a plurality of relatively thin rollers or discs 950 that are driven by a lower left roller drive 948, as shown and described below with respect to FIGS. 11a-c. Each of the rollers 950 include roller teeth 952 about their outer perimeter. The roller teeth 952 are angled toward the direction the object is to be urged (the rear of the heavy-duty object collecting head 106). As with the other roller blocks, the lower right roller block 938 includes a plurality of relatively thin rollers or discs 942 that are driven by a lower right roller drive 946, as shown and described below with respect to FIGS. 11a-c. Each of the rollers 942 include roller teeth 944 about their outer perimeter. The roller teeth 944 are angled toward the direction the object is to be urged (the rear of the heavy-duty object collecting head 106). The roller blocks 926, 936, 938 may be belt, linkage or gear driven as described below with respect to FIGS. 11a-c. Each of the rollers discussed herein include a plurality of rollers extending between other rollers within the respective plurality of rollers mounted on adjacent drive shafts, in a staggered arrangement, and each of the rollers includes an outer perimeter and a plurality of teeth about the outer perimeter.

In summary, the upper roller block of the heavy duty roller-based object collecting head includes: a first front plate, a first rear plate, a plurality of first drive shafts extending through a plurality of first bushings in the first front plate and the first rear plate, a plurality of rollers mounted on the plurality of first drive shafts in an axially spaced relationship, and a first roller drive for driving the first plurality of drive shafts. Similarly, the lower left roller block includes: a second front plate, a second rear plate, a plurality of second drive shafts extending through a plurality of second bushings in the second front plate and the second rear plate, a plurality of second rollers mounted on the plurality of second drive shafts in an axially spaced relationship; and a second roller drive for driving the plurality of second drive shafts. Likewise, the lower right roller block includes: a third front plate, a third rear plate, a plurality of third drive shafts extending through a plurality of third bushings in the third front plate and the third rear plate, a plurality of third rollers mounted on the plurality of third drive shafts in an axially spaced relationship, and a third roller drive for driving the plurality of third drive shafts.

Figure 11A:
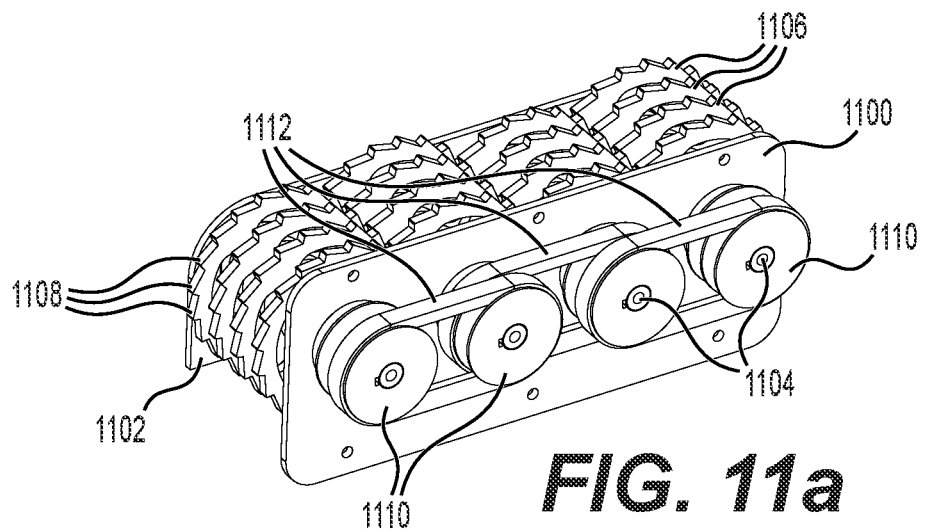
FIG. 11A is an isometric side view of the internal components of a belt driven embodiment of a roller block of the heavy-duty object collecting head of FIGS. 1-2 and 5-6.
Figure 11B:
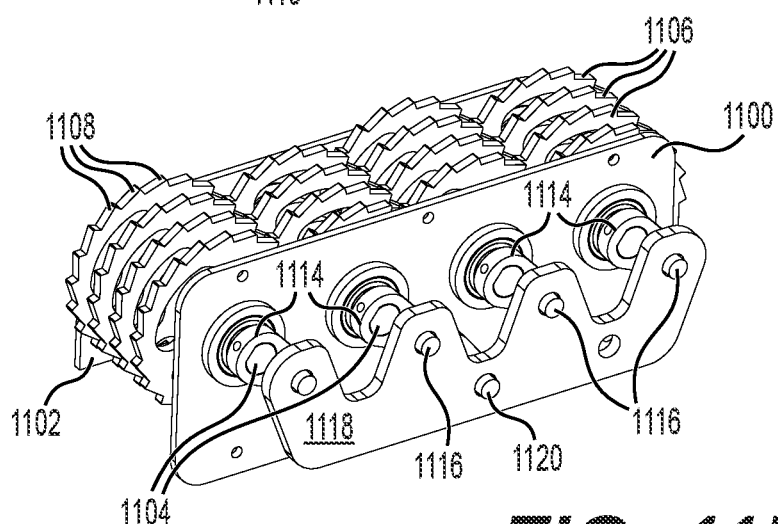
FIG. 11B is an isometric side view of the internal components of a linkage driven embodiment of a roller block of the heavy-duty object collecting head of FIGS. 1-2 and 5-6.
Figure 11C:
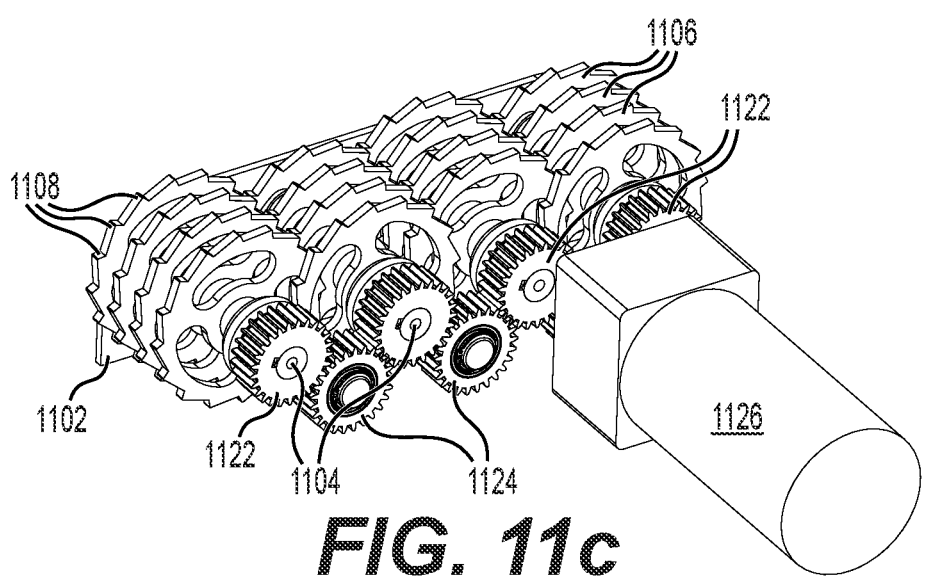
FIG. 11C is an isometric side view of the internal components of a gear driven embodiment of a roller block of the heavy-duty object collecting head of FIGS. 1-2 and 5-6.

The internal components of a belt driven embodiment of the roller blocks are shown in FIG. 11a, while the internal components of a linkage driven embodiment of the roller blocks are shown in FIG. 11b and the internal components of a gear driven embodiment of the roller blocks are shown in FIG. 11c. All three embodiments include a relatively rectangular front plate 1100 (omitted from FIG. 11c for clarity) and a relatively rectangular rear plate 1102. A plurality of (four shown) drive shafts 1104 extend through bushings in the front plate 1100 and the rear plate 1102. Each drive shaft 1104 include a plurality of (four shown) rollers 1106, mounted thereon in an axially spaced relationship. As shown, the rollers 1106 extend between rollers 1106 mounted on adjacent drive shafts 1104, in a staggered arrangement. The rollers 1106 may include roller teeth 1108 as previously described.

The belt driven roller block embodiment, as shown in FIG. 11a, includes a plurality (four) double pulleys 1110 mounted on the external ends of the drive shafts 1104. Three drive belts 1112 extend between adjacent pulleys 1110, such that driving any of the drive shafts 1104, results in all four drive shafts 1104 being driven.

The linkage driven roller block embodiment, as shown in FIG. 11b, includes a plurality of (four) eccentrics 1114 mounted on the external ends of the drive shafts 1104. The eccentrics 1114 include radially offset pins 1116 that each extend through holes in a relatively planar linkage 1118. A drive pin 1120 extends through a further hole in the linkage 1118 and may be driven by a drive eccentric, which in turn is driven by an actuator or electric motor, thereby resulting in all four drive shafts 1104 being driven.

The gear driven roller block embodiment, as shown in FIG. 11c, includes a plurality of (four) drive gears 1122 mounted on the external ends of the drive shafts 1104. Three idler gears 1124 are mounted between adjacent drive gears 1122, such that all of the drive gears 1122 turn in the same direction, as is known in gearing systems. A gear drive 1126 is connected to one of the drive gears 1122 or idler gears 1124, such that all of the drive gears and drive shafts 1104 are driven.

Figure 12:
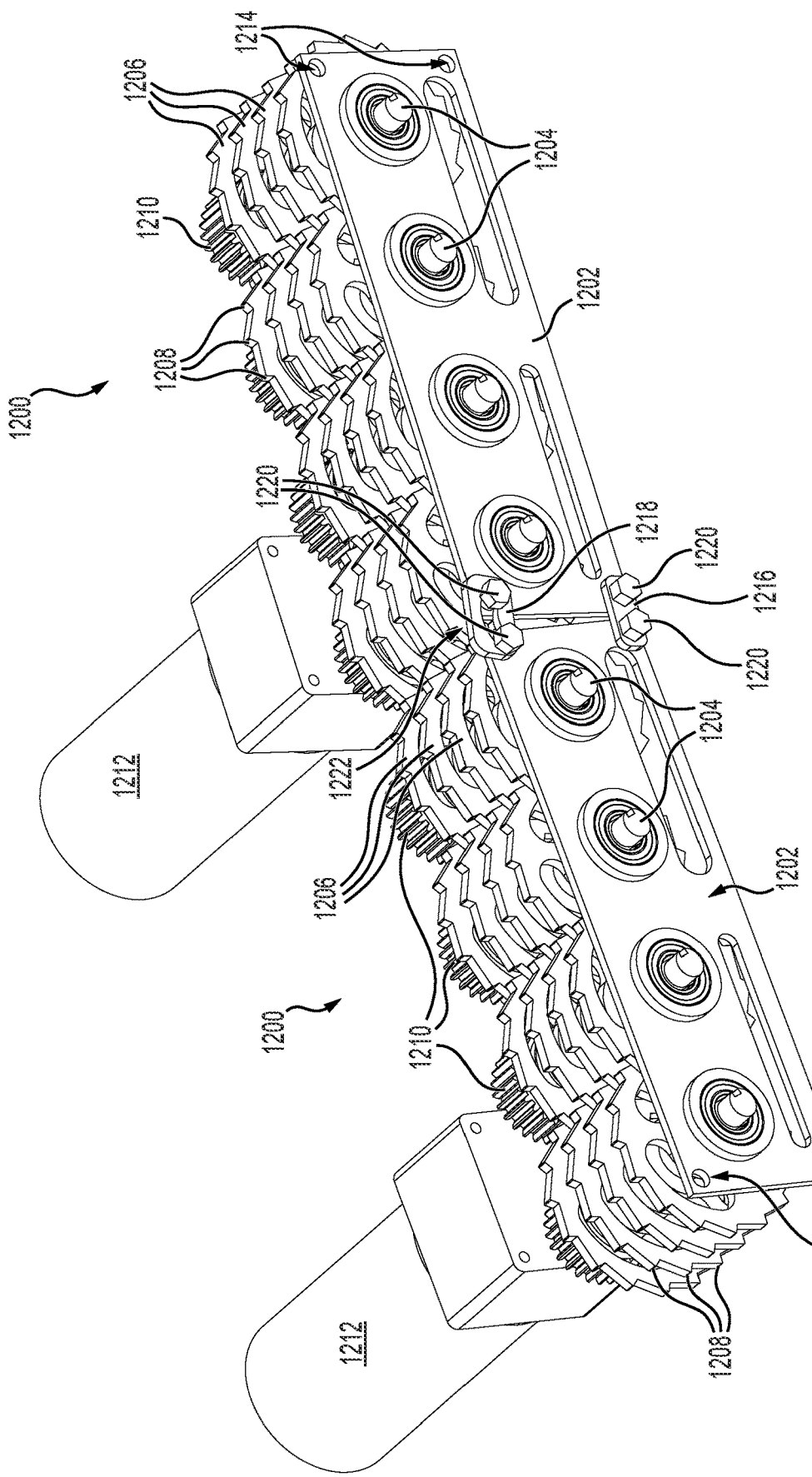
FIG. 12 is an isometric side view of two gear driven roller blocks of the heavy-duty object collecting head of FIGS. 1-2 and 5-6, connected in series.

In FIG. 12, two gear driven connectable roller blocks 1200 are shown connected in series. While the roller blocks 1200 are shown as gear driven, they may alternatively be linkage or belt driven. As with the previously described roller blocks, roller blocks 1200 include a relatively rectangular front plate 1202 and a relatively rectangular rear plate (not shown). A plurality of (four shown) drive shafts 1204 extend through bushings in the front plate 1202 and the rear plate. Each drive shaft 1204 includes a plurality of (four shown) rollers 1206, mounted thereon in an axially spaced relationship. As shown, the rollers 1206 extend between rollers 1206 mounted on adjacent drive shafts 1204, in a staggered arrangement. The rollers 1206 may include roller teeth 1208 as previously described. The drive shafts 1204 are driven by a gear drive 1212 via drive gears 1210, as previously described with respect to the gear driven roller block embodiment, as shown in FIG. 11c. In addition, the front 1202 and rear plates include threaded holes 1214 adjacent each of their four corners. Two adjacent bottom corner holes of the front plates 1202 are shown connected to one another by a fixed link 1216 using bolts 1220 that extend through holes in the fixed link 1216 and are screwed into the threaded holes 1214. Two adjacent top corner holes of the front plates 1202 are shown connected to one another by an adjustable link 1218 using bolts 1220 that extend through a curved slot 1222 in the adjustable link 1218 and are screwed into the threaded holes 1214. The curved slot 1222 allows the distance between the adjacent top corner holes to be adjusted by loosening one of the bolts 1220, moving one of the roller blocks 1200 relative to the other, and then tightening the bolt 1220. The adjustable link 1218 may be used between the two adjacent bottom corner holes and the fixed link 1216 may be used between the adjacent top corner holes if the opposite adjustment direction is required.

Figure 13:
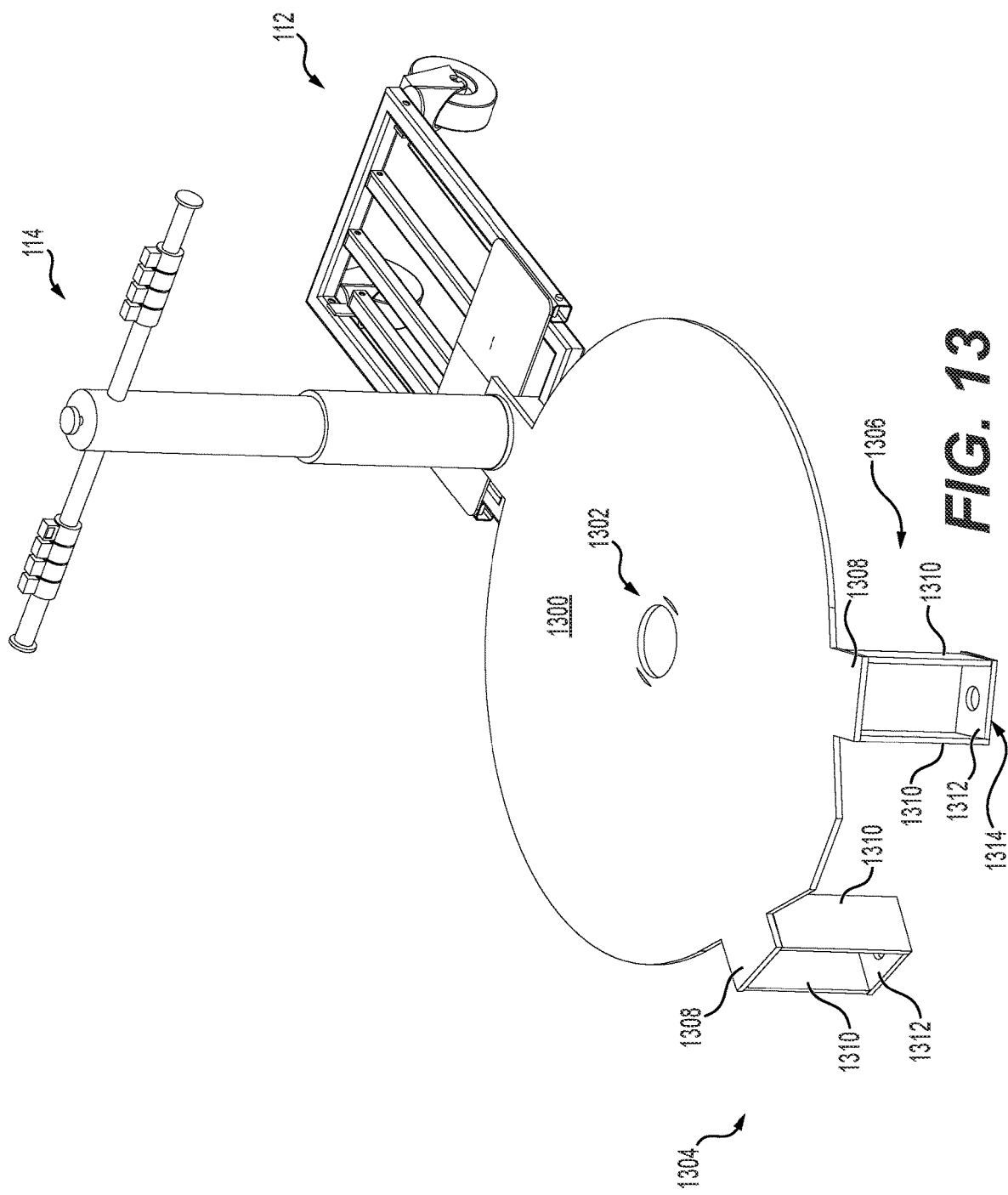
FIG. 13 is an isometric front-left view of a base cover and folding operation station assembly of the object collecting system of FIGS. 1-2.
Figure 14:
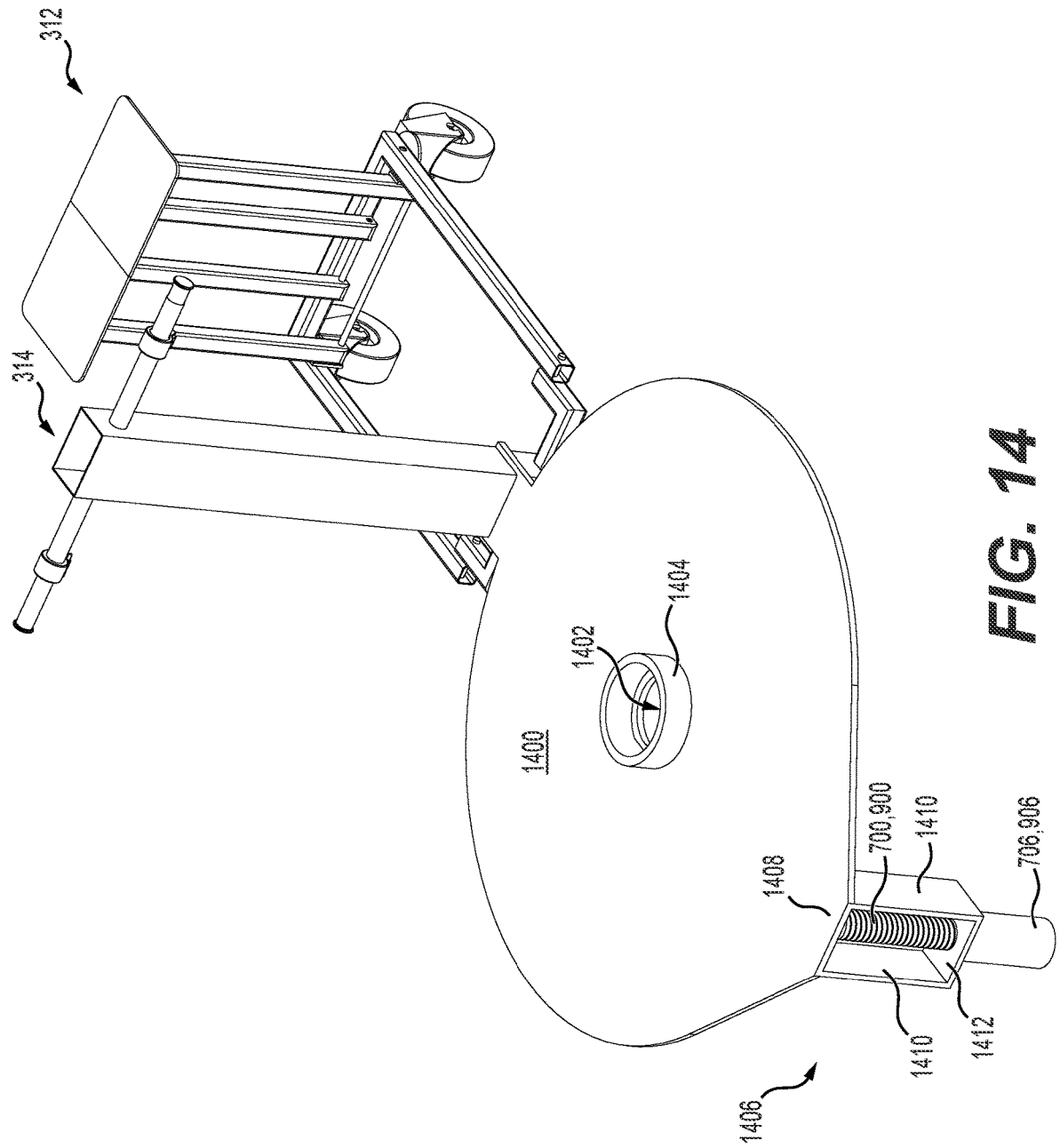
FIG. 14 is an isometric front-left view of a base cover and folding operation station assembly of the object collecting systems of FIGS. 3-6.

The details of a base cover 1300, a folding operation station assembly 112 and an operation control assembly 114 of the object collecting system of FIGS. 1-2 are shown in FIG. 13. The base cover 1300 is generally circular as with the base 108, although other base and base cover shapes are possible. The base cover 1300 includes a circular central hole 1302 for passage of a clutch 1816 as described below with respect to FIGS. 18a-b (not shown in FIG. 13). A clutch housing may surround the circular central hole 1302, as shown in FIG. 14 as clutch housing 1404, with respect to base cover 1400. The front of the base cover 1300 includes a right object collecting head support frame 1304 and a left object collecting head support frame 1306. The object collecting head support frames 1304, 1306 include support frame top walls 1308, support frame sidewalls 1310, and support frame bottom walls 1312. Central holes 1314 in bottom walls 1312, allow passage of an externally threaded support post 700, 900 as shown in in FIG. 14 with respect to base cover 1400, while the support frame sidewalls 1310 are engaged by the rear portion of the sidewalls of the slider 702, 902, to prevent rotation of the slider 702, 902 as the support post 700, 900 rotates.

The details of a base cover 1400, a folding operation station assembly 312 and an operation control assembly 314 of the object collecting system of FIGS. 3-6. The base cover 1400 is substantially similar to the base cover 1300 and includes a circular base cover 1400, a circular central hole 1402 and a clutch housing 1404. The base cover 1400, however, only includes a single object collecting head support frame 1406, for supporting a light-duty collecting head 104 or a heavy-duty object collecting head 106. The head support frame 1406 includes a support frame top wall 1408, support frame sidewalls 1410, and a support frame bottom wall 1412. A central hole in the bottom wall 1412, allows passage of an externally threaded support post 700, 900, while the support frame sidewalls 1410 are engaged by the rear portion of the sidewalls of the slider 702, 902, to prevent rotation of the slider 702, 902 when the support post 700, 900 is driven by the support post drive actuator 706, 906.

Figure 15:
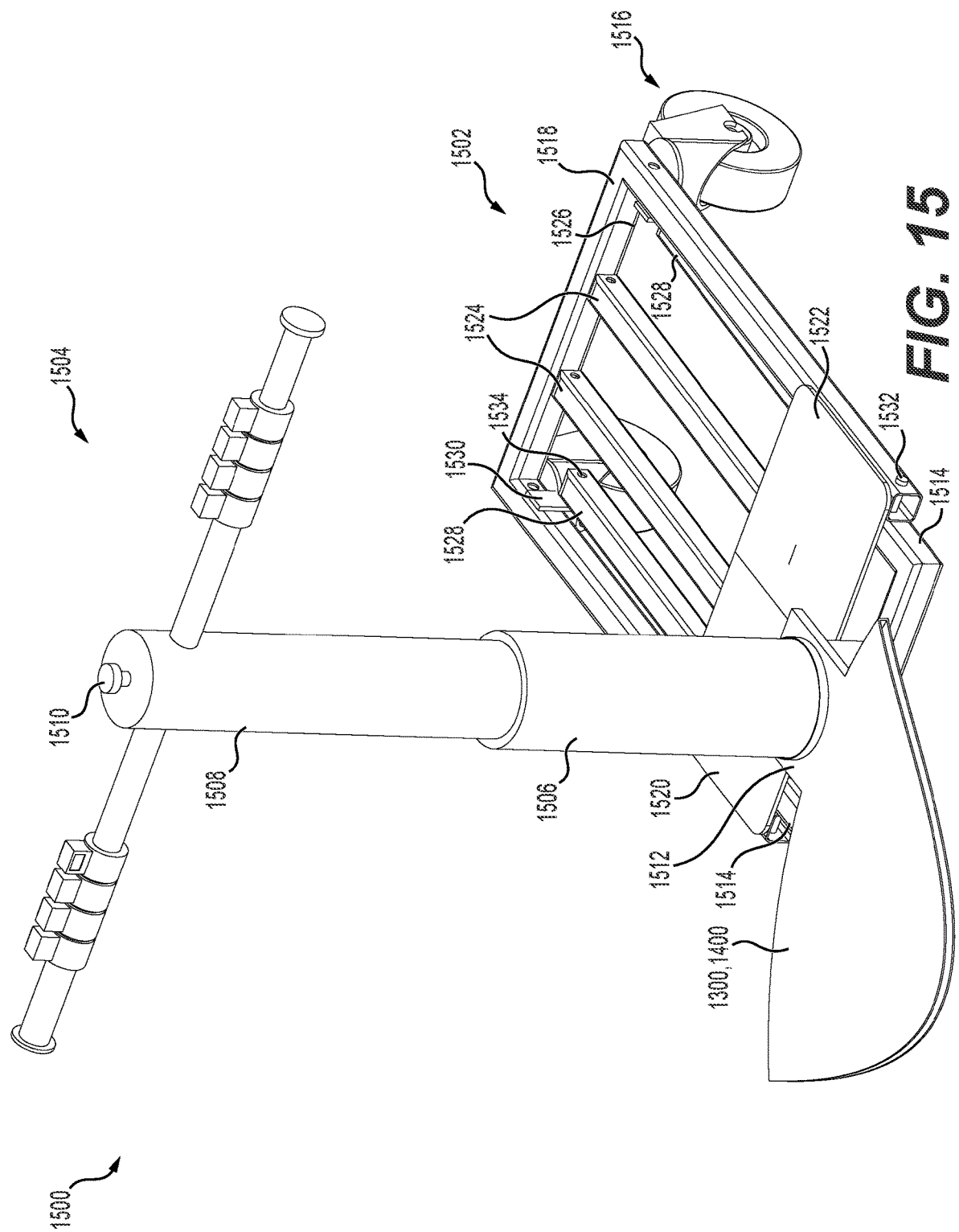
FIG. 15 is an isometric front-left view of a folding operation station assembly of the object collecting systems of FIGS. 1-6.
Figure 16:
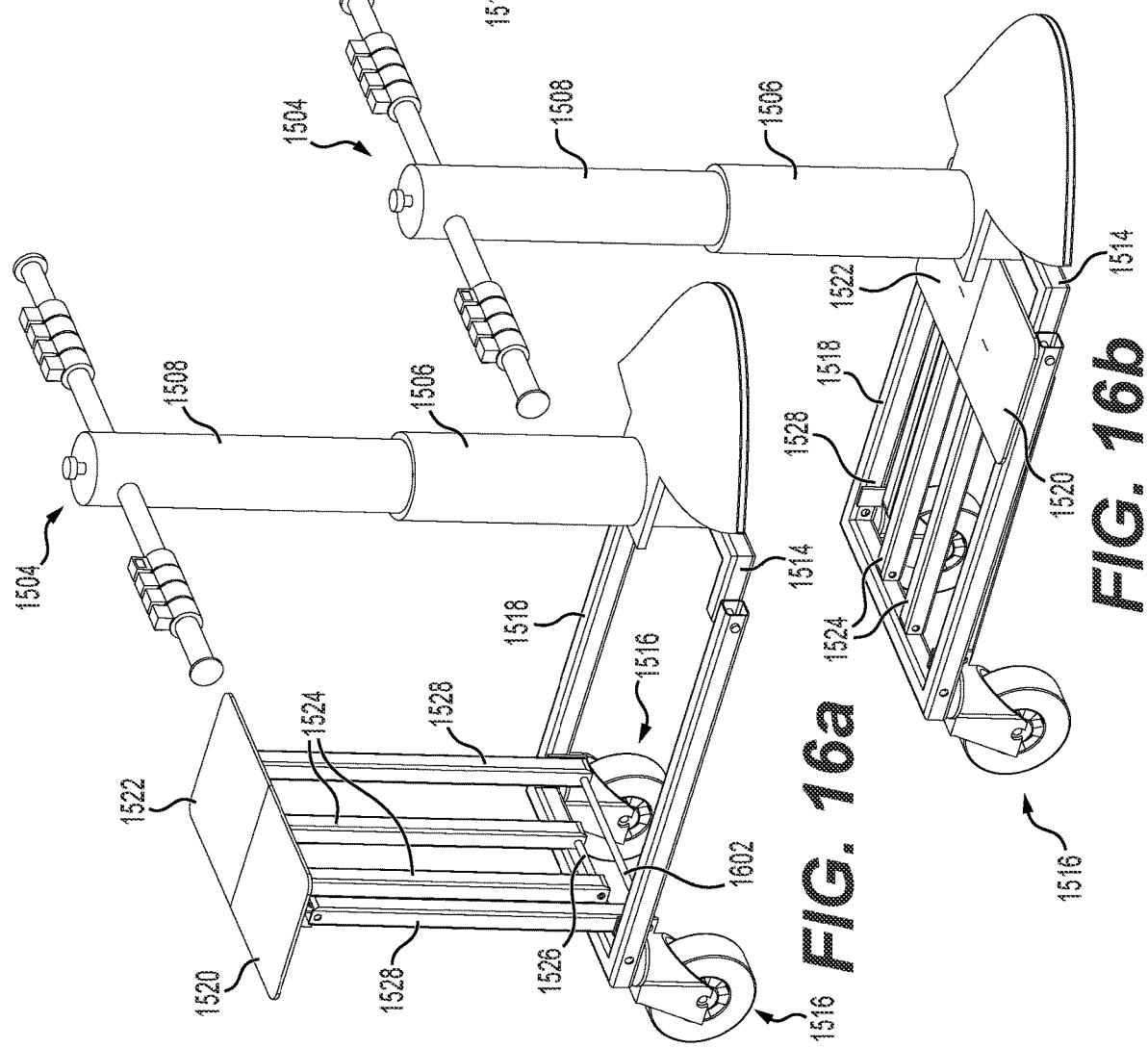
FIG. 16A is an isometric front-right view of the folding operation station assembly of FIG. 15, with the assembly in a seated, riding operator configuration.
FIG. 16B is an isometric front-right view of the operation station assembly of FIG. 15, with the assembly in a standing, riding operator configuration.
FIG. 16C is an isometric front-right view of the folding operation station assembly of FIG. 15, with the assembly in a folded, walk-behind operator configuration.

The details of a folding operation station assembly 1500 for use with the object collecting systems of FIGS. 1-6 are shown in FIGS. 15 and 16A-C. The folding operation station assembly 1500 includes a folding operator support frame 1502 and an operation control assembly 1504. The operation control assembly 1504 is supported by a telescoping mechanism including a lower support post 1506 and an upper telescoping support post 1508 that telescopes into and out of the lower support post 1506 to adjust the height of the operation control assembly 1504. An emergency shutdown button 1510 is pressed to remove electrical power from all of the electrical components of the object collecting system 100, 300, 500. The lower support post 1506 extends through a hole in a rear tab 1512 of the base cover 1300, 1400 and includes a notch 1600 (FIG. 16c) through which a front U-shaped frame member 1514 extends. A rear U-shaped frame member 1518 is rotationally connected to the front U-shaped frame member 1514 by pivot pins 1532. A right operator support panel 1520 and a left operator support panel 1522 are supported on inner panel support members 1524 and outer panel support members 1528. The rear end of the rear U-shaped frame member 1518 is supported on the ground by two non-powered casters 1516, when the rear U-shaped frame member 1518 is in its lowered position as shown in FIGS. 15 and 16a-b.

The inner panel support members 1524 are rotationally supported on inner panel support member pivot bar 1526 and rotationally connected to the respective support panel 1520, 1522, while the outer panel support members 1528 are rotationally supported on outer panel support member pivot pins 1534 extending from the bottom of pivot bar support tabs 1530 and rotationally connected to the respective support panel 1520, 1522. These arrangements form two parallelogram structures, such that the right operator support panel 1520 and the left operator support panel 1522 are maintained horizontal, regardless of their position. It should be noted that the outer panel support member pivot pins 1534 may be replaced by a single bar 1602 as shown in FIG. 16a.

In FIG. 16a the operation station assembly 1500 is shown in a seated, riding operator configuration. In this configuration, the inner panel support members 1524 and the outer panel support members 1528 are vertical and the right operator support panel 1520 and the left operator support panel 1522 are in a raised position to support a seated operator. The rear end of the rear U-shaped frame member 1518 is supported on the casters 1516 to allow the operation station assembly 1500 to follow the motion of the object collecting system 100, 300, 500.

FIG. 16b shows the operation station assembly 1500 in a standing, riding operator configuration. In this configuration, the inner panel support members 1524 and the outer panel support members 1528 are horizontal and the right operator support panel 1520 and the left operator support panel 1522 are in a lowered position to support a standing operator. As in the seated configuration, the rear end of the rear U-shaped frame member 1518 is supported on the casters 1516 to allow the operation station assembly 1500 to follow the motion of the object collecting system 100, 300, 500.

FIG. 16c shows the operation station assembly 1500 in a folded, walk-behind operator configuration. In this configuration, the rear U-shaped frame member 1518 is rotated upward and out of the way, to allow an operator to walk unimpeded behind the object collecting system 100, 300, 500 while still being able to operate the operation control assembly 1504.

Figure 17:
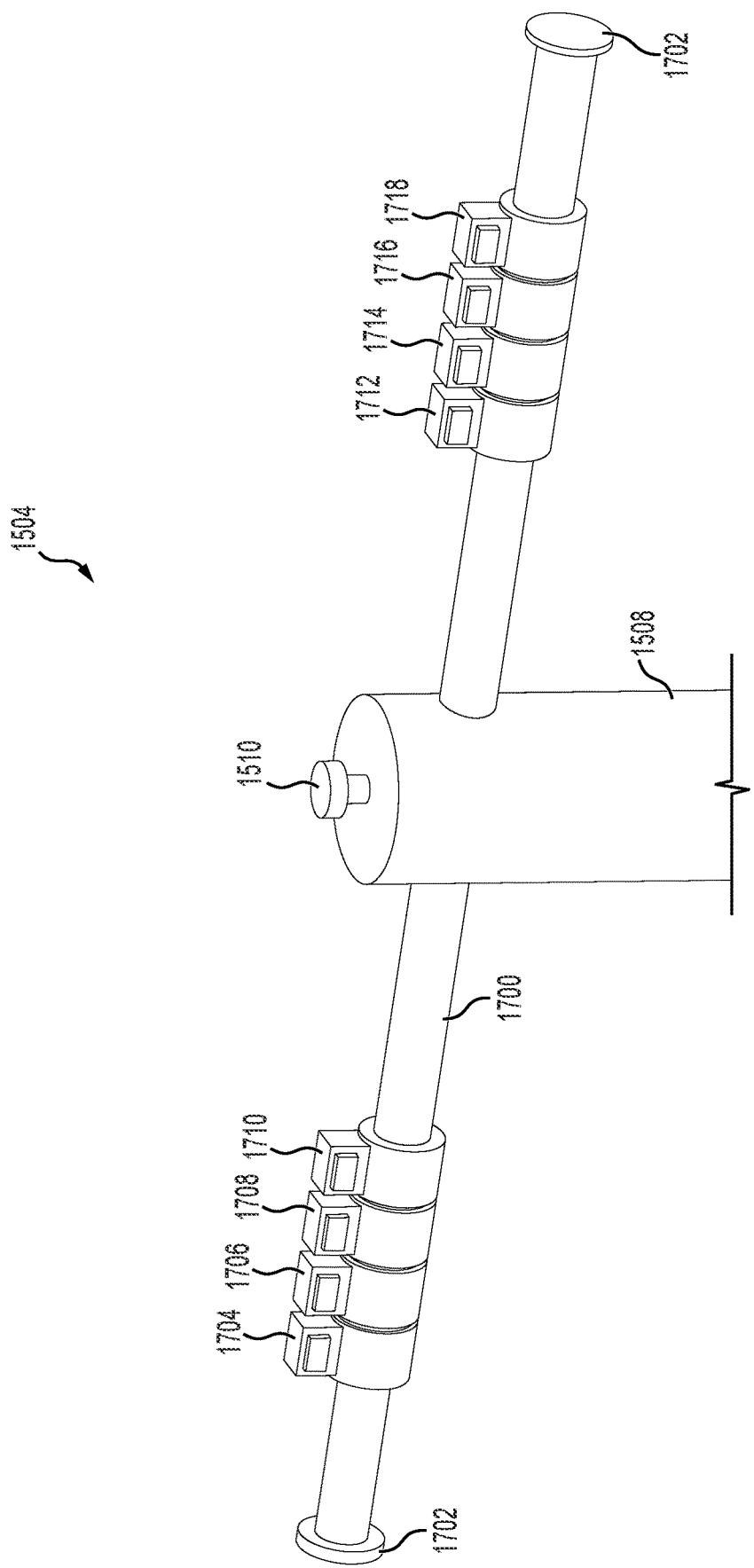
FIG. 17 is an isometric front-left view of an operation control assembly of the operation station assembly of FIG. 15.

The details of the operation control assembly 1504 of the operation station assembly 1500 of FIG. 15 are shown in FIG. 17. The operation station assembly 1500 includes a handle bar 1700 with end caps 1702. The right side of the handle bar 1700 includes a first right control toggle switch 1704, a second right control toggle switch 1706, a third right control toggle switch 1708 and a fourth right control toggle switch 1710, while the left side includes a first left control toggle switch 1712, a second left control toggle switch 1714, a third left control toggle switch 1716 and a fourth left control toggle switch 1718. In an embodiment, right toggle switches 1704, 1706, 1708, 1710 are used to control the light-duty collecting head 104 and/or the heavy-duty object collecting head 106. For example, in the object collecting system 100, the toggle switch 1704 may select which of the two heads 104, 106 to control. The toggle switch 1706 may raise and lower the selected head 104, 106 by energizing the associated support post drive actuator 706, 906. The toggle switch 1708 may adjust the tilt of the selected head 104, 106 by energizing the associated tilt actuator drives 724, 924. The toggle switch 1710 may control the associated upper chain drive 734 and lower chain drive 746 or the upper roller drive 934, lower right roller drive 946 and lower left roller drive 948. In an embodiment, left toggle switches 1712, 1714, 1716, 1718, are used to control the motion of the object collecting system 100, 300, 500, as described below with respect to a parallel self-maneuvering system 1806.

Figure 18A:
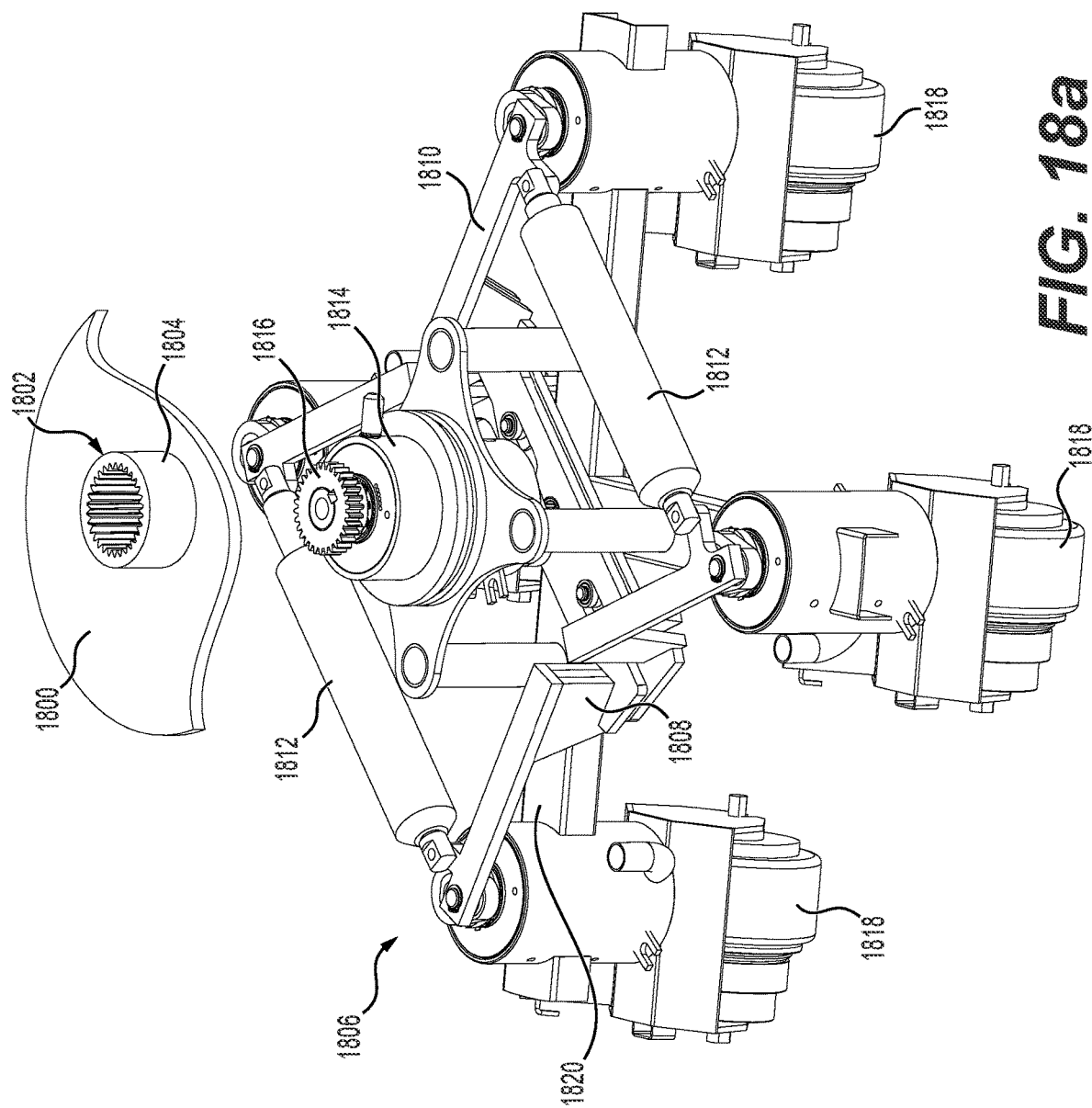
FIG. 18a is an isometric view of a parallel self-maneuvering system of the object collecting systems of FIGS. 1-6, with its wheels in a parallel configuration.
Figure 18B:
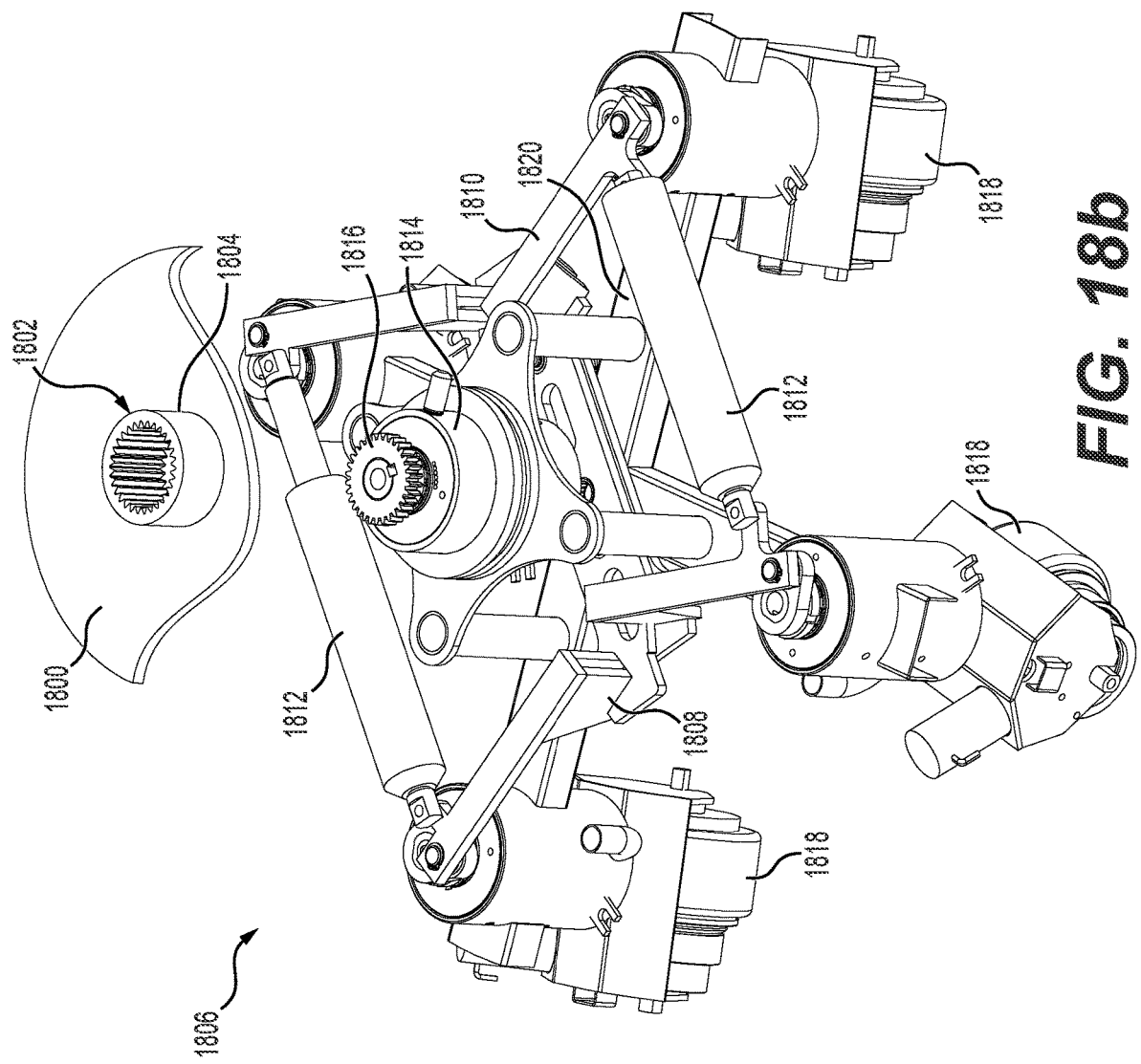
FIG. 18b is an isometric view of the parallel self-maneuvering system of FIG. 18a, with its wheels in a rotate-in-place configuration.

The details of a parallel self-maneuvering system 1806 of the object collecting systems of FIGS. 1-6 are shown in FIGS. 18a and 18b. Also shown in FIGS. 18a and 18b is a base cover 1800 with a central hole 1802 and a clutch housing 1804, similar to the base cover 1400 shown in FIG. 14. The parallel self-maneuvering system 1806 includes a first upper steering frame 1808 and a second upper steering frame 1810. The upper steering frames 1808, 1810 are shifted relative to one another by frame shifting actuators 1812. In the position shown in FIG. 18a, the wheels 1818 are maintained in a parallel configuration. An electrical steering actuator 1814 shifts both frames together to simultaneously steer all of the wheels 1818 in the desired direction. By actuating the frame shifting actuators 1812, as shown in FIG. 18b, the wheels 1818 are maintained in a rotate-in-place configuration, and the steering actuator 1814 is inoperative. A lower X-shaped frame 1820 supports the four housings of the individual steering shafts for the wheels 1818. One or more of the wheels may be driven by an electric motor or other type drive. Further details of similar mechanisms for parallel self-maneuvering systems are shown in U.S. Pat. No. 9,789,902 B1, issued on Oct. 17, 2017, U.S. Pat. No. 10,800,030 B1, issued on Oct. 13, 2020, and U.S. Pat. No. 11,414,128 B1, issued on Aug. 16, 2022, all to Cui et al and all hereby incorporated by reference in their entirety.

An electrically controllable clutch 1816 connects the parallel self-maneuvering system 1806 (or other type wheeled base 108) and the base cover 1800. When the clutch 1816 is energized, the base cover 1800 and the remainder of the object collecting system 100, 300, 500 is locked to the wheeled base 108 and rotates and translates therewith. When the clutch 1816 is deenergized, the base cover 1800 and the remainder of the object collecting system 100, 300, 500 can rotate independently relative to the wheeled base 108. In the deenergized condition, driving the wheeled base 108 in a particular direction, the operation station assembly 112, when lowered, as shown in FIGS. 16a-16b, will rotate to the rear of the wheeled base 108 to be aligned with the direction of travel.

Referring back to FIG. 17, in an embodiment, left toggle switch 1712 controls the electric motor to drive the wheels 1818 in a forward or reverse direction (or clockwise/counterclockwise when the wheels 1818 are in the rotate-in-place configuration, as shown in FIG. 18b). The toggle switch 1712 may be variable such that the amount of movement of the switch 1712 determines the speed the wheels 1818 are driven. The left toggle switch 1714 may control the steering actuator 1814 to steer the wheels 1818 in the desired direction, when the wheels 1818 are in the parallel configuration, as shown in FIG. 18*a*. The toggle switch 1716 may be used to lock and unlock the clutch 1816, while the toggle switch 1718 may be used to control the frame shifting actuators 1812 to switch the parallel self-maneuvering system 1806 between the parallel configuration (FIG. 18*a*) and the rotate-in-place configuration (FIG. 18*b*).

It is to be understood that the object collecting heads for object collecting systems are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A heavy-duty roller-based object collecting head for object collecting systems, comprising:
   an upper roller block with a first plurality of object conveying rollers;
   a lower left roller block with a second plurality of object conveying rollers;
   a lower right roller block with a third plurality of object conveying rollers; and
   at least two roller drives for driving the first, second and third pluralities of object conveying rollers;
   wherein:
      the lower right roller block is attached to the lower left roller block by an angled bracket, thereby forming a trench between the lower roller blocks; and
      the upper roller block is attached to one of the lower roller blocks by at least one spring-loaded hinge, such that the upper roller block is urged toward the lower roller blocks to grasp an object therebetween.

2. The heavy-duty roller-based object collecting head for object collecting systems as recited in claim 1, wherein:
   the first plurality of object conveying rollers are arranged in a staggered arrangement wherein some of the first plurality of rollers extend between other rollers of the first plurality of rollers;
   the second plurality of object conveying rollers are arranged in a staggered arrangement wherein some of the second plurality of rollers extend between other rollers of the second plurality of rollers; and
   the third plurality of object conveying rollers are arranged in a staggered arrangement wherein some of the third plurality of rollers extend between other rollers of the third plurality of rollers.

3. The heavy-duty roller-based object collecting head for object collecting systems as recited in claim 1, wherein:
   the upper roller block comprises:
      a first front plate;
      a first rear plate;
      a plurality of first drive shafts extending through a plurality of first bushings in the first front plate and the first rear plate; wherein
      the plurality of rollers are mounted on the plurality of first drive shafts in an axially spaced relationship; and
      the at least two roller drives include a first roller drive for driving the first plurality of drive shafts;
   the lower left roller block comprises:
      a second front plate;
      a second rear plate;
      a plurality of second drive shafts extending through a plurality of second bushings in the second front plate and the second rear plate; wherein
      the plurality of second rollers are mounted on the plurality of second drive shafts in an axially spaced relationship; and
      the at least two roller drives include a second roller drive for driving the plurality of second drive shafts; and
   the lower right roller block comprises:
      a third front plate;
      a third rear plate;
      a plurality of third drive shafts extending through a plurality of third bushings in the third front plate and the third rear plate; wherein
      the plurality of third rollers are mounted on the plurality of third drive shafts in an axially spaced relationship: and
      the at least two roller drives include a third roller drive for driving the plurality of third drive shafts.

4. The heavy-duty roller-based object collecting head for object collecting systems as recited in claim 3, wherein:
   the rollers of the plurality of first rollers extend between other rollers of the first plurality of rollers mounted on adjacent drive shafts of the plurality of first drive shafts, in a staggered arrangement;
   the rollers of the plurality of second rollers extend between other rollers of the plurality of second rollers mounted on adjacent drive shafts of the plurality of second drive shafts, in a staggered arrangement; and
   the rollers of the plurality of third rollers extend between other rollers of the plurality of third rollers mounted on adjacent drive shafts of the plurality of third drive shafts, in a staggered arrangement.

5. The heavy-duty roller-based object collecting head for object collecting systems as recited in claim 3, wherein:
   each of the plurality of first rollers include an outer perimeter and a plurality of first roller teeth about their outer perimeter; and
   each of the plurality of second rollers include an outer perimeter and plurality of second roller teeth about their outer perimeter;
   each of the plurality of third rollers include an outer perimeter and a plurality of third roller teeth about their outer perimeter;
   each of the pluralities of first, second and third roller teeth are angled toward a direction an object is to be urged by the object collecting head.

6. The heavy-duty roller-based object collecting head for object collecting systems as recited in claim 3, wherein the upper roller block, the lower left roller block and the lower right block are belt driven.

7. The heavy-duty roller-based object collecting head for object collecting systems as recited in claim 3, wherein the upper roller block, the lower left roller block and the lower right block are linkage driven.

8. The heavy-duty roller-based object collecting head for object collecting systems as recited in claim 3, wherein the upper roller block, the lower left roller block and the lower right block are gear driven.

9. A light-duty chain-based object collecting head for object collecting systems, comprising:
   an upper chain block including:
      a first drive shaft;
      a first driving sprocket mounted on the first drive shaft;
      a second driving sprocket mounted on the first drive shaft;
      a plurality of first idler sprockets;
      a plurality of second idler sprockets;

a first object conveying chain mounted on the first driving sprocket and the plurality of first idler sprockets;
a second object conveying chain mounted on the second driving sprocket and the plurality of second idler sprockets; and
a first chain drive for driving the first drive shaft;
a lower left chain block including:
a second drive shaft;
a third driving sprocket mounted on the second drive shaft;
a plurality of third idler sprockets; and
a third object conveying chain mounted on the third driving sprocket and the plurality of third idler sprockets; and
a lower right chain block including:
a fourth drive shaft;
a fourth driving sprocket mounted on the fourth drive shaft;
a plurality of fourth idler sprockets;
a fourth object conveying chain mounted on the fourth driving sprocket and the plurality of fourth idler sprockets; and wherein:
the lower right chain block is attached to the lower left chain block by an angled bracket, thereby forming a trench between the lower chain blocks;
the upper chain block is attached to one of the lower chain blocks by at least one spring-loaded hinge, such that the upper chain block is urged toward the lower chain blocks to grasp an object therebetween; and
the object collecting head further comprises at least one second chain drive for driving the third drive shaft and the fourth drive shaft.

10. The light-duty chain-based object collecting head for object collecting systems as recited in claim 9, wherein the first chain drive and the at least one second chain drive comprise rotary actuators.

11. The light-duty chain-based object collecting head for object collecting systems as recited in claim 9, wherein:
the first chain includes a plurality of first links;
the second chain includes a plurality of second links;
the third chain includes a plurality of third links; and
the fourth chain includes a plurality of fourth links;
wherein each of the pluralities of first, second, third and fourth links includes two oppositely extending chain side flanges attached thereto.

12. An object collecting system, comprising,
an object holding bin; and
at least one object collecting head for grasping and transporting objects into the object holding bin, the at least one object collecting head comprising a first heavy-duty roller-based object collecting head, the first heavy-duty roller-based object collecting head including:
an upper roller block with a first plurality of object conveying rollers;
a lower left roller block with a second plurality of object conveying rollers;
a lower right roller block with a third plurality of object conveying rollers; and
at least two roller drives for driving the first, second and third pluralities of object conveying rollers; and
wherein:
the lower right roller block is attached to the lower left roller block by an angled bracket, thereby forming a trench between the lower roller blocks; and
the upper roller block is attached to one of the lower roller blocks by at least one spring-loaded hinge, such that the upper roller block is urged toward the lower roller blocks to grasp an object therebetween.

13. The object collecting system as recited in claim 12, wherein:
the at least one object collecting head further comprises a single light-duty chain-based object collecting head, the single light-duty chain-based object collecting head including;
an upper chain block with a first object conveying chain;
a lower left chain block with a second object conveying chain; and
a lower right chain block with a third object conveying chain.

14. The object collecting system as recited in claim 12, wherein:
the at least one object collecting head further comprises a second heavy-duty roller-based object collecting head, the second heavy-duty roller-based object collecting head including;
a second upper roller block with a fourth plurality of object conveying rollers;
a second lower left roller block with a fifth plurality of object conveying rollers; and
a second lower right roller block with a sixth plurality of object conveying rollers.

15. The object collecting system as recited in claim 12, wherein:
the rollers of the first plurality of object conveying rollers extend between other rollers of the first plurality of object conveying rollers in a staggered arrangement;
the rollers of the second plurality of object conveying rollers extend between other rollers of the second plurality of object conveying rollers in a staggered arrangement; and
the rollers of the third plurality of object conveying rollers extend between other rollers of the third plurality of object conveying rollers in a staggered arrangement.

16. The object collecting system as recited in claim 12, further comprising a wheeled base with a base cover supporting the object holding bin.

17. The object collecting system as recited in claim 16, further comprising an electrically controllable clutch connecting the wheeled base to the base cover.

18. The object collecting system as recited in claim 17, further comprising an operation station assembly with an operation control assembly, the operation station assembly being attached to the base cover.

19. The object collecting system as recited in claim 12, further comprising an adjustable support assembly for raising, lowering and tilting the at least one object collecting head relative to the object holding bin.

* * * * *